United States Patent
Aoki et al.

[11] Patent Number: 5,836,285
[45] Date of Patent: Nov. 17, 1998

[54] DEVICE FOR CONTROLLING KNOCKING IN AN INTERNAL COMBUSTION ENGINE

[75] Inventors: Keiichiro Aoki; Kazuhisa Mogi; Koichi Nakata, all of Susono; Yasuo Ito, Nagoya; Youichi Kurebayashi, Toyohashi, all of Japan

[73] Assignee: Toyota Jidosha Kabushiki Kaisha, Aichi, Japan

[21] Appl. No.: 933,320

[22] Filed: Sep. 18, 1997

[30] Foreign Application Priority Data

Sep. 19, 1996 [JP] Japan ................................. 8-247962
Jul. 18, 1997 [JP] Japan ................................. 9-194488

[51] Int. Cl.$^6$ .................................................. F02P 5/152
[52] U.S. Cl. ........................................ 123/418; 123/425
[58] Field of Search ................................... 123/418, 425, 123/435

[56] References Cited

FOREIGN PATENT DOCUMENTS 6159129A 6/1994 Japan .

Primary Examiner—Erick R. Solis
Attorney, Agent, or Firm—Kenyon & Kenyon

[57] ABSTRACT

A device for controlling knocking includes a first unit which applies a voltage across a pair of electrodes installed in a combustion chamber of the internal combustion engine, detects an ionic current flowing between said pair of electrodes through ions generated when a gas mixture in the combustion chamber burns, and discriminates whether the knocking is occurring or not based upon the ionic current that is detected. The device for controlling knocking further includes a second unit which detects vibration of the cylinder block by using a vibration sensor installed in the cylinder block of the internal combustion engine, and discriminates whether the knocking is occurring or not based upon the vibration of the cylinder block that is detected. The device for controlling knocking controls the ignition timing of the internal combustion engine based upon the result of discrimination of either the first unit or the second unit depending upon the operation region of the internal combustion engine. The device for controlling knocking maintains a high knocking detecting precision and a high ignition timing control precision throughout the whole operation region of the internal combustion engine and for all cylinders.

6 Claims, 23 Drawing Sheets

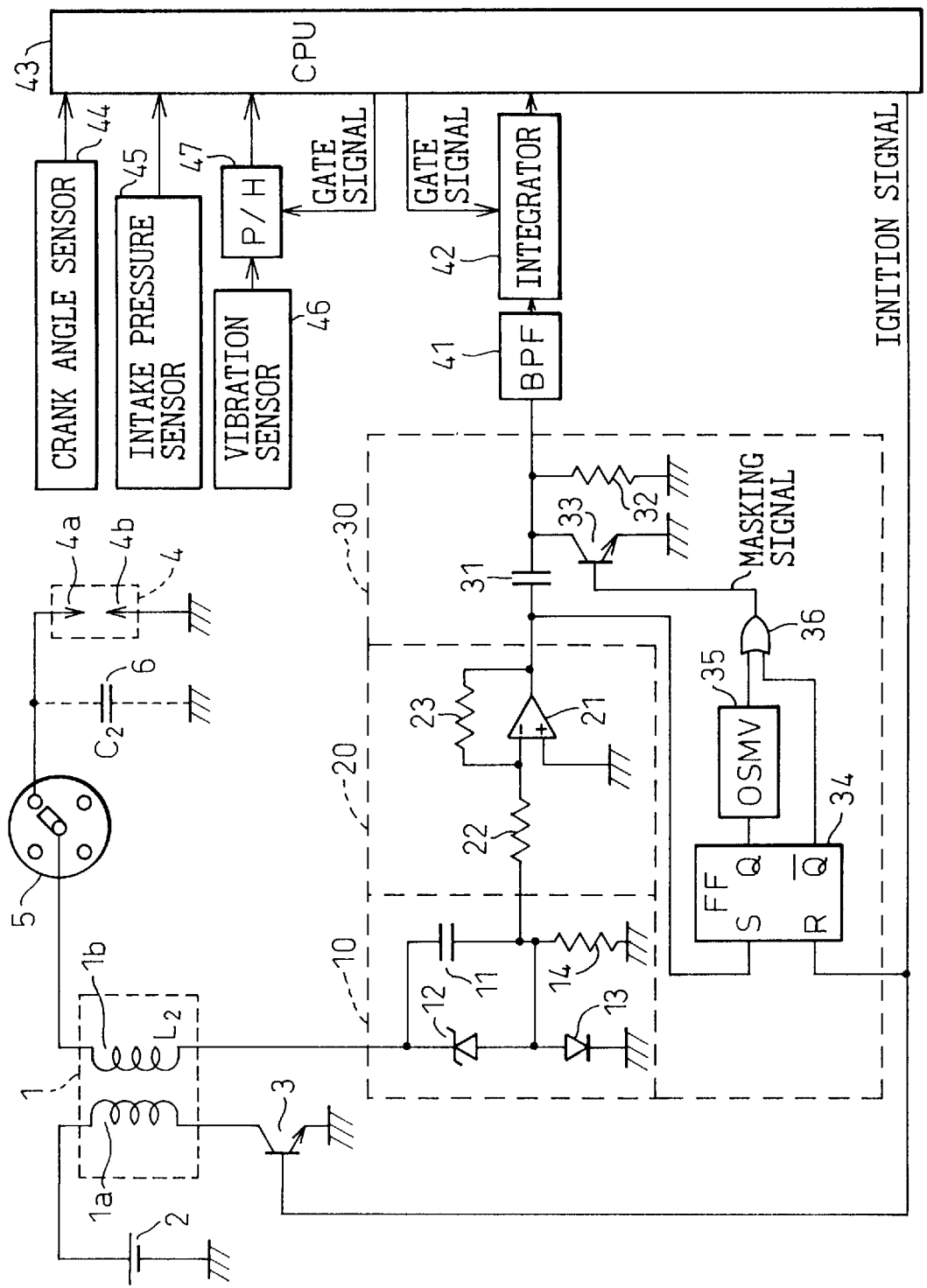

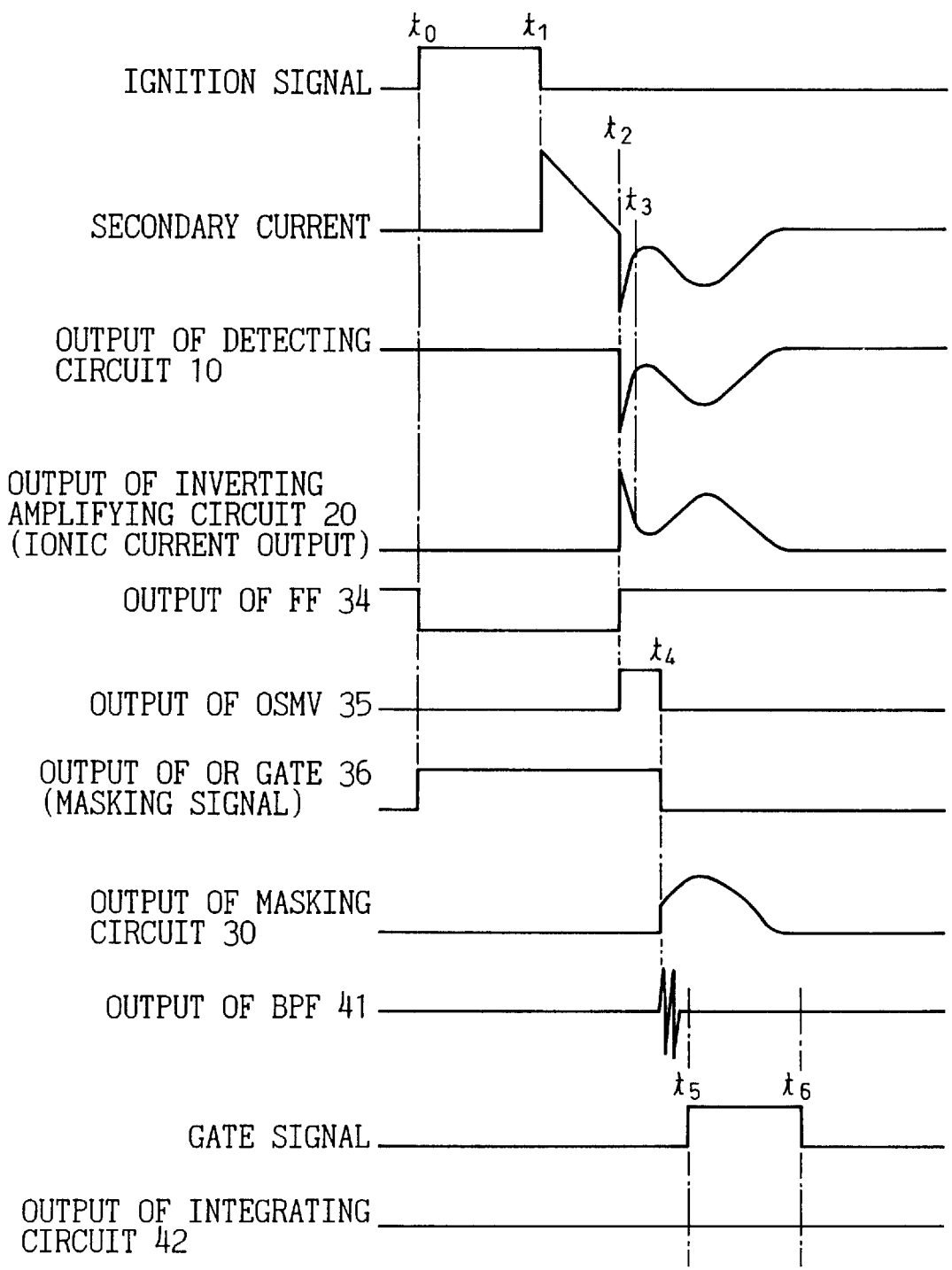

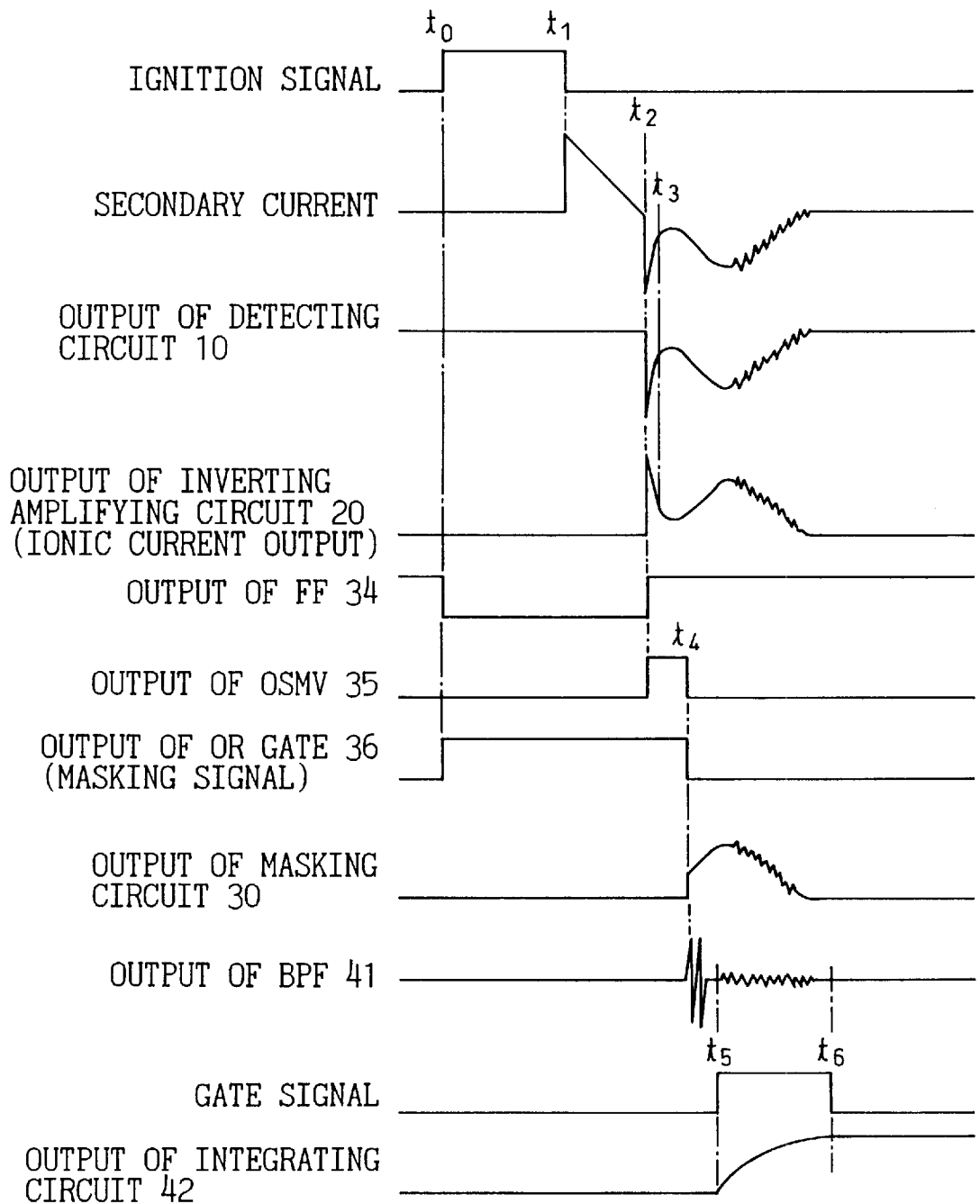

FREQUENCY COMPONENTS OF 6-7 kHz ARE CONTAINED

XKCS MAP

| NE<br>PM | 1000rpm | 2000rpm | ----- | 6000rpm | 7000rpm |
|---|---|---|---|---|---|
| 134mmHg | 0 | 0 | ----- | 0 | 0 |
| 291mmHg | 0 | 0 | ----- | 0 | 1 |
| 447mmHg | 0 | 0 | ----- | 1 | 1 |
| 603mmHg | 0 | 1 | ----- | 1 | 1 |
| 759mmHg | 1 | 1 | ----- | 1 | 1 |

IGNITION TIMING GUARD MAP DURING THE HIGH SPEED OPERATION

| PM | 134mmHg | 291mmHg | 447mmHg | 603mmHg | 759mmHg |
|---|---|---|---|---|---|
| T1 | 38.0 | 32.0 | 26.0 | 24.0 | 22.0 |

DEVICE FOR CONTROLLING KNOCKING IN AN INTERNAL COMBUSTION ENGINE

BACKGROUND OF THE INVENTION

1. Field of the Invention

The present invention relates to a device, for controlling knocking, which advances the ignition timing up to near a limit at which knocking occurs while detecting the occurrence of knocking of an internal combustion engine.

2. Description of the Related Art

In a gasoline engine, a gas mixture near a spark plug is ignited by a spark produced by the spark plug, and the flame propagates to the whole gas mixture, i.e., the gasoline burns. Here, abnormal burning can be represented by knocking. Knocking is a phenomenon in which when the pressure becomes abnormally high while the flame is propagating, the unburned portion (terminal gas) is self-ignited without waiting for the propagation of flame. When knocking occurs, the combustion gas vibrates enabling the heat to be easily propagated often causing the engine to be damaged. Knocking has an intimate relationship to the ignition timing. A maximum combustion pressure increases with an advance in the ignition timing, and knocking easily occurs at a higher pressure.

To enhance the heat efficiency and to decrease the consumption of fuel, it is necessary to use a high compression ratio. Therefore, knock control has been carried out as part of ignition timing control, according to which the ignition timing is advanced to near a limit at which knocking occurs while detecting the occurrence of knocking. According to a conventional generally employed method of detecting knocking, a vibration sensor is mounted on a cylinder block to detect knocking vibration. In recent years, however, a method has been proposed which utilizes a change in the ionic current in the cylinder caused by the occurrence of knocking.

That is, as the electric discharge is produced by the spark plug and the gas mixture in the combustion chamber burns, the gas mixture is ionized. When a voltage is applied to the spark plug in a state where the gas mixture is ionized, an ionic current flows. The ionic current is detected and analyzed to detect the occurrence of knocking. When knocking occurs, in general, vibration components of 6 to 7 kHz appear on the ionic current. In a device for detecting knocking based upon the ionic current, the frequency components specific to knocking are picked up through a filter, and knocking is discriminated based upon the magnitude thereof.

Japanese Unexamined Patent Publication (Kokai) No. 6-159129 discloses a method wherein the frequency components near 6.3 kHz are picked up as knocking vibration components from the output of an ionic current detecting circuit using a band-pass filter, the frequency components that are picked up are integrated, and the occurrence of knocking is detected based upon the result of integration.

When a secondary winding (secondary coil) of an ignition coil is included in a passage in which the ionic current flows, there also flows a current other than the ionic current. That is, even when the discharge of the spark plug is finished, the ignition coil holds a residual magnetic energy. The ignition coil works to emit this energy, and an LC resonance takes place between the inductance L of the coil and the stray capacity C of a high-tension line. When the electric discharge is finished, as described above, an LC resonance current flows due to the residual magnetic energy of the coil irrespective of the ionic current. Therefore, this current could become a noise (hereinafter referred to as LC resonance noise or residual magnetic noise) from the standpoint of detecting knocking. The period in which the LC resonance noise appears is nearly constant after the spark discharge is finished, irrespective of the engine rotational speed.

On the other hand, the period in which vibration appears due to knocking varies depending upon the crank angle period, and is, for example, from 15° to 60° CA ATDC (crank angle after top dead center). In a region of high engine rotational speed, the time is shortened from a moment at which the spark discharge ends to a period in which the knocking occurs (15° CA ATDC). In a region of high engine rotational speed, therefore, the LC resonance noise may continue up to knocking vibration period. In such a case, there appear components that pass through a band-pass filter that is provided for picking up the frequency components related to knocking vibration, and it may be erroneously determined that knocking is occurring even though knocking is not really occurring.

During the exhaust gas recirculation (EGR) and low-load operation, furthermore, the combustion loses stability, and vibration components due to unstable combustion may often be contained in the ionic current output signals. The vibration components due to unstable combustion become noise (hereinafter referred to as combustion variation noise) at the time of discriminating knocking relying upon knocking vibration components. The frequency of combustion variation noise ranges from 1 to 7 kHz. Therefore, it is difficult to separate knocking vibration components from combustion variation noise components. That is, when combustion variation noise exists, there also appear components that pass through the band-pass filter that is provided for picking up the frequency components related to knocking vibration, and it is erroneously determined that knocking is occurring though knocking is not really occurring.

In detecting knocking using the conventional vibration sensor, on the other hand, the sensor is usually mounted on a cylinder block. Therefore, a vibration level is detected with good precision from a cylinder close to the sensor, but good precision is not maintained for the cylinders remote from the sensor, arousing a problem of different SN ratios among the cylinders. There also remains a problem in that the SN ratio decreases due to mechanical noise.

SUMMARY OF THE INVENTION

In detecting knocking based upon the ionic current as described above, the signal-to-noise ratio (SN ratio) may drop in a particular operation region, and a favorable knocking detecting precision is not guaranteed for all operation regions of the internal combustion engine. Even when knocking is detected by using the vibration sensor, it is difficult to solve the problems of variance in the SN ratio among the cylinders and a drop in the SN ratio caused by mechanical noise. In view of such circumstances, the object of the present invention is to provide a device for controlling knocking of an internal combustion engine, which is capable of maintaining a high knocking detecting precision in all operation regions of the internal combustion engine and for all cylinders.

In order to accomplish the above-mentioned object according to a first aspect of the present invention, there is provided a device for controlling knocking of an internal combustion engine, comprising:

a first occurrence-of-knocking discrimination means which applies a voltage across a pair of electrodes installed in a combustion chamber of the internal combustion engine, detects an ionic current flowing between said pair of electrodes through ions generated when a mixture gas in the combustion chamber burns, and discriminates whether the knocking is occurring or not based upon the ionic current that is detected;

a second occurrence-of-knocking discrimination means which detects vibration of the cylinder block by using a vibration sensor installed in the cylinder block of the internal combustion engine, and discriminates whether the knocking is occurring or not based upon the vibration of the cylinder block that is detected; and an ignition timing control means which controls the ignition timing of the internal combustion engine based upon the result of discrimination of either said first occurrence-of-knocking discrimination means or said second occurrence-of-knocking discrimination means depending upon the operation region of the internal combustion engine.

According to a second aspect of the present invention, there is provided a device for controlling knocking of an internal combustion engine of the first aspect of the invention, wherein, when the internal combustion engine is in a high rotational speed operation region in which it is difficult to pick up the knocking vibration components from the ionic current signals due to noise caused by LC resonance in the ionic current passage, said ignition timing control means controls the ignition timing based upon the result of discrimination by said second occurrence-of-knocking discrimination means.

According to a third aspect of the present invention, there is provided a device for controlling knocking of an internal combustion engine of the first aspect of the invention, wherein, when the internal combustion engine is in a low rotational speed operation region in which it is difficult to pick up the knocking vibration components from the ionic current signals due to noise caused by variation in the combustion, said ignition timing control means controls the ignition timing based upon the result of discrimination by said second occurrence-of-knocking discrimination means.

According to a fourth aspect of the present invention, there is provided a device for controlling knocking of an internal combustion engine of the first aspect of the invention, wherein, when the internal combustion engine is in a high rotational speed operation region in which it is difficult to pick up the knocking vibration components from the vibration of the cylinder block due to mechanical noise, said ignition timing control means controls the ignition timing based upon the result of discrimination by said first occurrence-of-knocking discrimination means.

According to a fifth aspect of the present invention, there is provided a device for controlling knocking of an internal combustion engine of the first to fourth aspects of the present invention, wherein the internal combustion engine has a plurality of cylinders, and when said ignition timing control means controls the ignition timing based upon the result of discrimination by said first occurrence-of-knocking discrimination means, a difference is determined between an ignition timing for a reference cylinder and an ignition timing for a cylinder other than the reference cylinder, and when said ignition timing control means controls the ignition timing based upon the result of discrimination by said second occurrence-of-knocking discrimination means, an ignition timing is calculated for the reference cylinder relying upon the result of discrimination by said second occurrence-of-knocking discrimination means and an ignition timing for a cylinder other than the reference cylinder is calculated by correcting the ignition timing for the reference cylinder by said difference in the ignition timing.

According to a sixth aspect of the present invention, there is provided a device for controlling knocking of an internal combustion engine of the first to fourth aspects of the invention, wherein when the internal combustion engine is in an operation region where it is difficult to pick up the knocking vibration components from the ionic current signals due to noise caused by LC resonance in the ionic current passage and it is difficult to pick up the knocking vibration components from the vibration of the cylinder block due to mechanical noise, said ignition timing control means inhibits the discrimination by said first and second occurrence-of-knocking discrimination means, and fixes the ignition timing to a predetermined value.

According to the device for controlling knocking of an internal combustion engine of the first aspect of the present invention constituted as described above, discrimination of knocking based upon the ionic current and discrimination of knocking based upon the output of the vibration sensor are suitably changed over in the operation regions, making it possible to discriminate knocking maintaining precision over a wide operation region.

According to the device for controlling knocking of an internal combustion engine of the second aspect of the present invention, a high knocking detecting precision is maintained by discriminating knocking relying upon the output of the vibration sensor even when the internal combustion engine is in the high rotational speed operation region in which it is difficult to discriminate knocking by the ionic current due to noise caused by LC resonance in the ionic current passage.

According to the device for controlling knocking of an internal combustion engine of the third aspect of the present invention, a high knocking detecting precision is maintained by discriminating knocking relying upon the output of the vibration sensor even when the internal combustion engine is in the low rotational speed operation region in which it is difficult to discriminate knocking by the ionic current due to noise caused by variation in the combustion.

According to the device for controlling knocking of an internal combustion engine of the fourth aspect of the present invention, a high knocking detecting precision is maintained by discriminating knocking relying upon the ionic current even when the internal combustion engine is in the high rotational speed operation region in which it is difficult to discriminate knocking, by relying upon the output of the vibration sensor, due to mechanical noise.

According to the device for controlling knocking of an internal combustion engine of the fifth aspect of the present invention, a suitable difference in the ignition timing among the cylinders obtained by controlling knocking based upon the ionic current, can be reflected in the control of knocking based upon the output of the vibration sensor.

According to the device for controlling knocking of an internal combustion engine of the sixth aspect of the present invention, erroneous discrimination is reliably avoided in the operation regions where a sufficient degree of knocking detecting precision is not obtained by either the discrimination of knocking based upon the ionic current or the discrimination of knocking based upon the output of the vibration sensor.

BRIEF DESCRIPTION OF THE DRAWINGS

Further features and advantages of the present invention will be apparent from the following description with reference to the accompanying drawings, in which:

FIG. 1 is a diagram illustrating the circuit constitution of an ignition device and of a device for controlling knocking according to an embodiment of the present invention;

FIG. 2 is a timing chart of various signals for explaining the processing for discriminating knocking based upon the ionic current, and illustrates the case where it is discriminated that no knocking is occurring;

FIG. 3 is a timing chart of various signals for explaining the processing for discriminating knocking based upon the ionic current, and illustrates the case where it is discriminated that knocking is occurring;

DESCRIPTION OF THE PREFERRED EMBODIMENTS

Figure 4A:
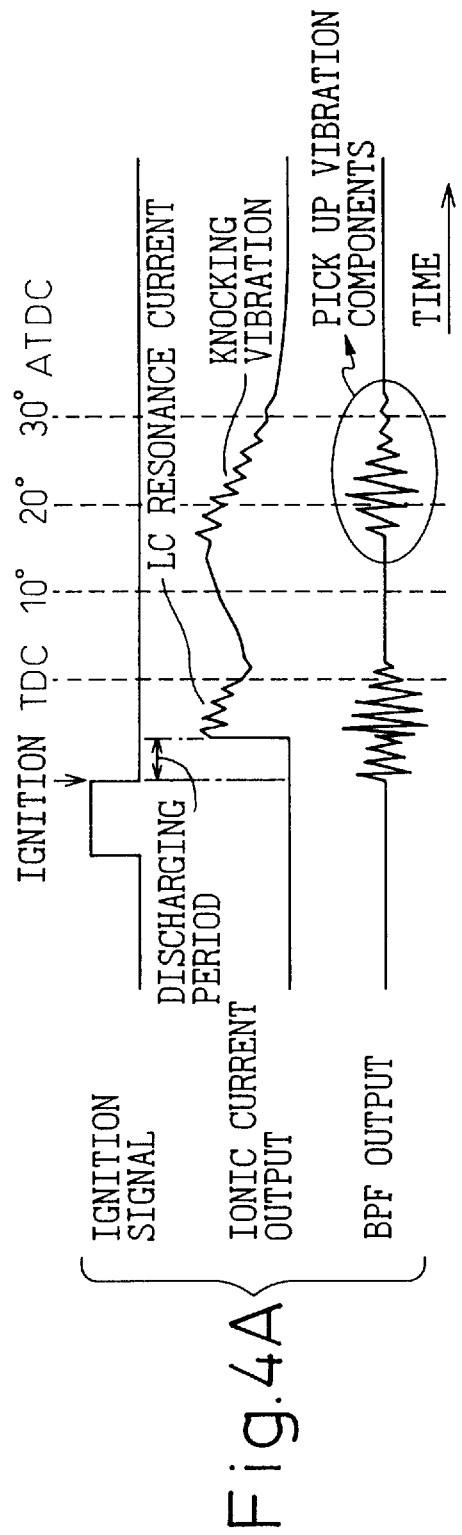
FIGS. 4A and 4B are timing charts illustrating the states where the noise components due to LC resonance and knocking vibration components are superposed on the ionic current signal in a low rotational speed region and in a high rotational speed region.

Embodiments of the invention will now be described with reference to the accompanying drawings.

FIG. 1 is a diagram illustrating the circuit constitution of an ignition device and of a device for controlling knocking according to an embodiment of the present invention. An end of a primary winding 1a of an ignition coil 1 is connected to the positive electrode of a battery 2, and the other end thereof is connected to the collector of a transistor 3 which works as a switching means. The emitter of the transistor 3 is grounded and the base thereof receives an ignition signal. An end of a secondary winding 1b of the ignition coil 1 is connected to a center electrode 4a of a spark plug 4 provided for each cylinder via a distributor 5. The outer electrode 4b of the spark plug 4 is grounded.

An ionic current detecting circuit 10 is provided on the side of the other end of the secondary winding 1b of the ignition coil 1. First, a capacitor 11 serving as a power source for forming ionic current is connected to the secondary winding 1b. A constant-voltage diode (Zener diode) 12 is connected in parallel with the capacitor 11 to maintain constant the voltage of the capacitor 11 which is electrically charged with a secondary current of the ignition coil. The other end of the capacitor 11 is grounded via a diode 13 which permits the flow of a current in the grounding direction only and is further grounded via an ionic current detecting resistor 14.

The connection point of the capacitor 11 and the ionic current detecting resistor 14 is connected to an inverting amplifying circuit 20. The inverting amplifying circuit 20 is constituted by an operational amplifier 21 of which a non-inverting input terminal (positive terminal) is grounded, an input resistor 22 is connected to an inverting input terminal (negative terminal) of the operational amplifier 21, and a feedback resistor 23 is connected from the output terminal to the inverting input terminal (negative terminal) of the operational amplifier 21. The output of the inverting amplifying circuit 20 is an ionic current output signal.

The output of the inverting amplifying circuit 20 is guided to a masking circuit 30. The masking circuit 30 masks the ionic current output signal, so that no signal is transmitted to the succeeding stages during the period in which the noise occurs. First, the output of the inverting amplifying circuit 20 is connected to an end of a capacitor 31 which cuts the DC components, and the other end of the capacitor 31 is grounded via a resistor 32 for obtaining an output voltage and is further connected to the collector of a transistor 33. The emitter of the transistor 33 is grounded. To the base of the transistor 33 is applied a masking signal for designating a masking period. That is, while the masking signal remains active, the output voltage of the masking circuit 30 becomes zero.

Provision is made of a flip-flop (FF) 34, a one-shot multi-vibrator (OSMV) 35 and an OR gate 36 for forming the masking signal. A set input of the FF 34 is connected to the output of the inverting amplifying circuit 20. An ignition signal is applied to a reset input of the FF 34. A non-inverting output of the FF 34 is sent to the input of the OSMV 35, and its inverting output is sent to one input of the OR gate 36. An output of the OSMV 35 is sent to the other input of the OR gate 36. The output or masking signal of the OR gate 36 is connected to the base of the transistor 33.

The output of the masking circuit 30 is sent to a band-pass filter (BPF) 41 which receives signals from the masking circuit 30 and picks up the frequency components related to knocking vibration, i.e., picks up the frequency components near 6 to 7 kHz. An integrating circuit 42 provided in the succeeding stage of the BPF 41 integrates the output signals of the BPF 41 while the gate signal supplied from the CPU 43 remains active. A peak-holding (P/H) circuit may be provided instead of the integrating circuit.

On the cylinder block of the internal combustion engine is mounted a vibration sensor 46 for detecting the vibration of the block. The output of the vibration sensor 46 is input to the peak-holding (P/H) circuit 47, and the output of the peak-holding circuit 47 is fed to the CPU 43 and is used for processing for discriminating knocking based upon the vibration of the cylinder block.

The central processing unit (CPU) 43 controls knocking, converts the analog output voltage of the integrating circuit 42 or of the P/H circuit 47 into a digital output voltage, and so discriminates that knocking is occurring when the voltage becomes greater than a predetermined reference value. The CPU 43 detects the operation condition based upon the outputs from various sensors including a crank angle sensor 44 and an intake pressure sensor 45, totally discriminates the condition of the engine in addition to the occurrence of knocking, determines an optimum ignition timing, and outputs an ignition signal. The CPU 43 determines a gate period for the integrating circuit 42 and the P/H circuit 47, and supplies a gate signal to the integrating circuit 42 and to the P/H circuit 47.

FIGS. 2 and 3 are time charts of various signals of the device of FIG. 1, and explain the knocking discrimination processing based upon the ionic current, wherein FIG. 2 illustrates a case where it is discriminated that no knocking is occurring and FIG. 3 illustrates a case where it is discriminated that knocking is occurring. First, when the ignition signal assumes a high level at a timing $t_0$ and the transistor 3 is turned on, a current flows into the primary winding 1a of the ignition coil. At the timing $t_0$, furthermore, the FF 34 is reset by the ignition signal, and the OR gate 36 produces an output of a high level upon receiving an inverted output from the FF 34.

Then, at a timing $t_1$, the ignition signal assumes a low level, the transistor 3 is turned off, and the primary current is shut off, whereby a high voltage is induced in the secondary winding 1b of the ignition coil 1 and, as a result, a spark discharge takes place at the spark plug 4. A spark discharge occurs between the center electrode 4a and the outer electrode (grounded electrode) 4b, and a secondary current continues to flow from the secondary winding 1b of the ignition coil to the secondary winding 1b through capacitor 11, constant-voltage diode 12, diode 13 and spark plug 4, from the timing $t_1$, to a timing $t_2$. In this step, the capacitor 11 is electrically charged up to a voltage that is in agreement with the Zener voltage (about 100 V) of the constant-voltage diode 12.

At a timing when the discharge is finished or at the timing $t_2$, the ignition coil works to emit residual magnetic energy, LC resonance takes place between an inductance $L_2$ of the secondary winding 1b of the ignition coil and a stray capacity $C_2$ (designated at 6 in FIG. 1) formed on a high-tension line, and a secondary current flows due to LC resonance. The LC resonance current flows through the ionic current detecting resistor 14. Therefore, a steep change appears on the output waveforms of the ionic current detecting circuit 10 and of the inverting amplifying circuit 20 after the end of the discharge. However, this change is due to residual magnetic noise (LC resonance noise) which is different from the ionic current. At the timing $t_2$, furthermore, the FF 34 is set upon receiving the output from the inverting amplifying circuit 20 and, in response thereto, the OSMV 35 outputs a signal at a high level for a predetermined period of time, i.e., from the timing $t_2$ to a timing $t_4$. As a result, the output of the OR gate 36 assumes a high level from the timing $t_0$ to the timing $t_4$. The predetermined period of time $t_4-t_2$ has been set to be longer than the time in which the residual magnetic noise is generated, and the timing $t_4$ is after the timing $t_3$ at which the flow of the LC resonance current ends.

An ionic current flows after the timing $t_3$ at which the LC resonance current due to the residual magnetic energy ends, i.e., at which the residual magnetic noise ends. In other words, when the gas mixture in the combustion chamber is ignited by the spark discharge at the spark plug 4 and burns, the gas mixture is ionized. When the gas mixture is in the ionized state, the gas mixture between two electrodes of the spark plug 4 becomes conducting. Here, an ionic current flows since a voltage has been applied across the two electrodes of the spark plug 4 due to a charging voltage of the capacitor 11. The ionic current flows from an end of the capacitor 11 to the other end of the capacitor 11 through secondary winding 1b of the ignition coil, spark plug 4 and ionic current detecting resistor 14. A potential—negative ionic current value x detecting resistance—appears at the point where the ionic current detecting resistor 14 and the capacitor 11 are connected together, and is inversion-amplified through the inverting amplifying circuit 20. The output of the inverting amplifying circuit 20 is supplied to the masking circuit 30.

At the timing $t_4$ which is after the timing $t_3$ as described above, the output or the masking signal of the OR gate 36 becomes inactive, and the masking is reset. Therefore, the output of the masking circuit 30 discretely changes at the timing $t_4$ at which the masking is reset. A step-like change in the signal includes a wide range of frequency components and the components that pass through the BPF 41 of the subsequent stage turn into noise.

The ionic current signal is a low-frequency signal in synchronism with the pressure in the cylinder. When knocking occurs, however, vibration due to knocking is superposed on a slope after the summit, i.e., superposed on a slope after a maximum pressure in the cylinder (usually around 15° CA ATDC) as shown in FIG. 3. The period in which knocking vibration appears is nearly within a predetermined range of crank angles irrespective of the engine rotational speed or, concretely, from about 15° to 60° CA ATDC. Therefore, a gate period designated by a gate signal supplied from the CPU 43 to the integrating circuit 42, i.e., the period from a timing $t_5$ to a timing $t_6$, must be determined to avoid noise that is generated when the masking is reset and by taking the period in which knocking vibration appears into consideration.

When no knocking occurs in a case where the gate period is properly set, the output of the BPF 41 is at a low level during the gate period as shown in FIG. 2, and the output of the integrating circuit 42 decreases. When knocking occurs, on the other hand, the output of the BPF 41 is at a high level during the gate period as shown in FIG. 3, and the output of the integrating circuit 42 increases. The CPU 43 compares the output of the integrating circuit 42 with a predetermined reference value for discrimination to discriminate the presence or absence of knocking.

Described below are six embodiments dealing with how the knocking control based upon the ionic current and the knocking control based upon the vibration sensor are used in the present invention relying upon the above-mentioned hardware constitution as a prerequisite.

Described below is a first embodiment. According to the first embodiment, knocking is controlled based upon the vibration sensor when the internal combustion engine is in a high rotational speed operation region where it is difficult to separate the knocking vibration components from the LC resonance current, i.e., from the LC resonance noise caused by residual magnetic energy in the ignition coil, and knocking is controlled based upon the ionic current when the internal combustion engine is in a low rotational speed operation region.

Figure 4B:
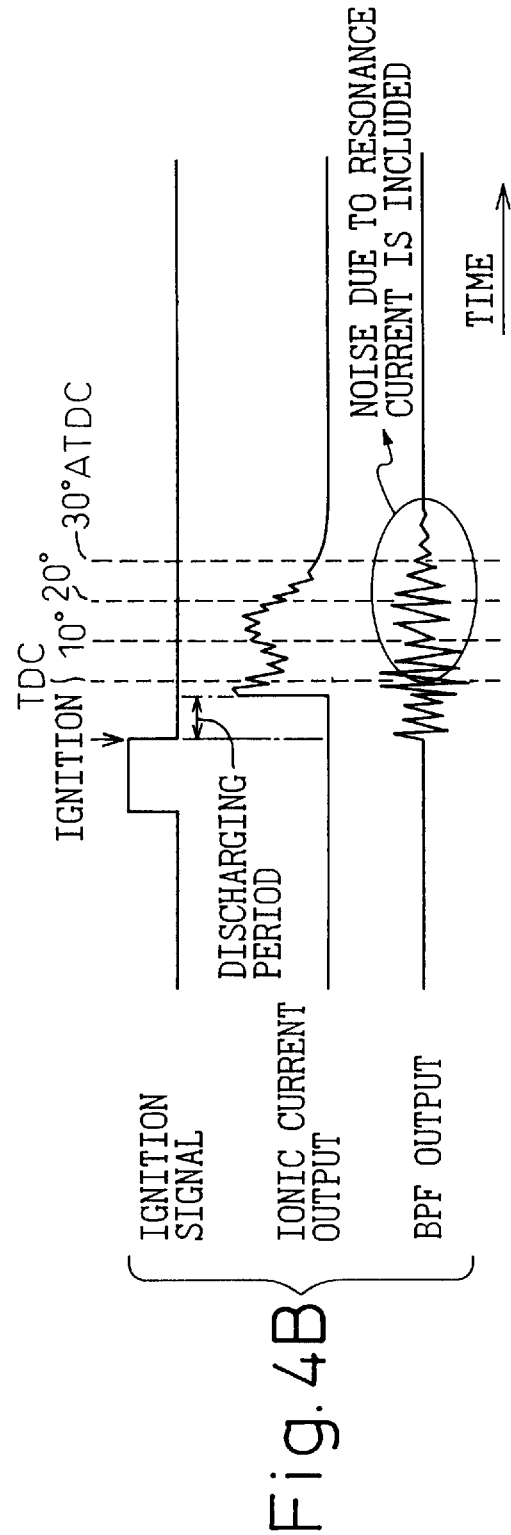

FIGS. 4A and 4B are time charts illustrating the LC resonance noise components and the knocking vibration components that are superposed on the ionic current signal in the low rotational speed region and in the high rotational speed region. After a steep LC resonance current has flown due to residual magnetic energy in the ignition coil, an ionic current which changes in large amounts flows into the ignition coil, which then triggers fine LC resonance, and whereby a fine LC resonance current is superposed as noise on the ionic current signal. The LC resonance noise continues to flow for nearly a predetermined period of time from the end of the spark discharge irrespective of the engine rotational speed.

On the other hand, the period in which the vibration due to knocking appears varies depending upon the crank angle as described above, and is, for example, from 15° to 60° CA ATDC. In the high engine rotational speed region, a process from the ignition, through spark discharge and combustion, up to the occurrence of knocking is shortened and, hence, the time is shortened from the end of the spark discharge to the occurrence of knocking (15° CA ATDC). In the low engine rotational speed region, therefore, the LC resonance noise components can be separated from the knocking vibration components as shown in FIG. 4A. In the high engine rotational speed region, however, it becomes difficult to separate the LC resonance noise components from the knocking vibration components, and noise enters into the BPF output signal as shown in FIG. 4B.

Figure 5:
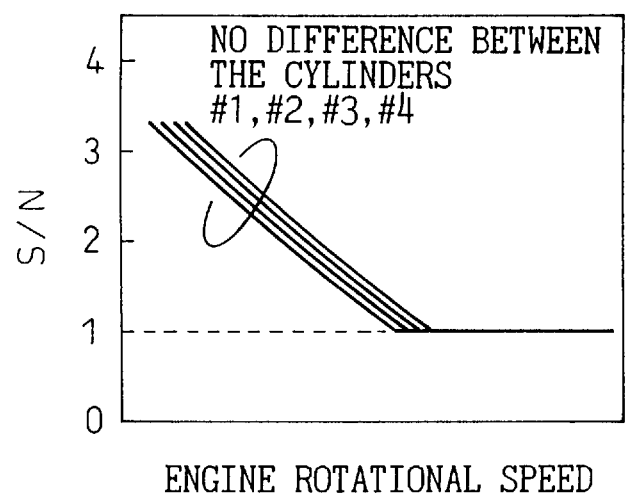
FIG. 5 is a diagram of characteristics when knocking is detected based upon the ionic current, and shows a relationship between the engine rotational speed (abscissa) and the SN ratio (ordinate)

FIG. 5 is a diagram of characteristics of when knocking is detected based upon the ionic current, and shows a relationship between the engine rotational speed (abscissa) and the SN ratio (ordinate). By using the ionic current, knocking can be detected for each of the cylinders. Therefore, there is no difference in the SN ratio among the cylinders as shown. In the high rotational speed region, however, it becomes difficult to detect knocking being affected by the LC resonance noise as described above.

Figure 6:
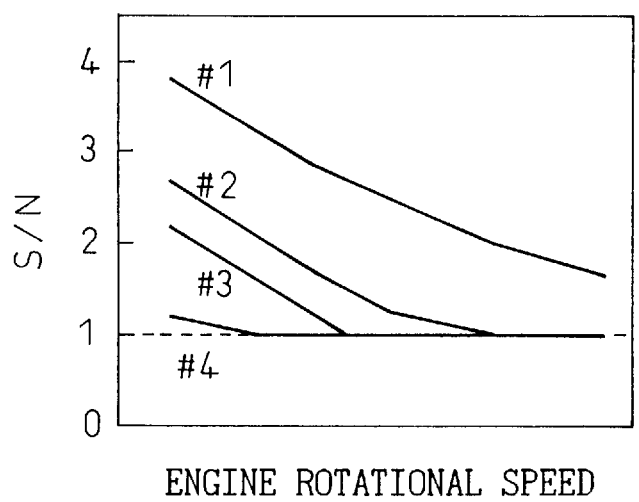
FIG. 6 is a diagram of characteristics, when knocking is detected based upon the vibration sensor, in the case when the vibration sensor is installed near a cylinder #1, and shows a relationship between the engine rotational speed (abscissa) and the SN ratio (ordinate)

FIG. 6 is a diagram of characteristics when knocking is detected based upon the vibration sensor in the case when the vibration sensor 46 is installed near the cylinder #1, and shows a relationship between the engine rotational speed (abscissa) and the SN ratio (ordinate). As shown, the SN ratio decreases in each of the cylinders as the rotational speed increases, and further decreases in a cylinder away from the vibration sensor. In the cylinder #1 close to the vibration sensor, the SN ratio decreases with an increase in the rotational speed, but the knocking can be detected throughout the whole rotational speed region. In the cylinders away from the vibration sensor, however, it becomes difficult to detect knocking in the high rotational speed region.

In the first embodiment, therefore, knocking is controlled based upon the ionic current in the low rotational speed region, and a difference in the ignition timing is determined between the ignition timing for a reference cylinder and the ignition timing for a cylinder other than the reference cylinder. In the high rotational speed region, knocking is controlled based upon the vibration sensor. In this case, however, the ignition timing is calculated for the reference cylinder depending upon the output of the vibration sensor. For a cylinder other than the reference cylinder, the calculated ignition timing for the reference cylinder is corrected by the above-mentioned difference in the ignition timing, thereby to calculate an ignition timing.

Figure 7:
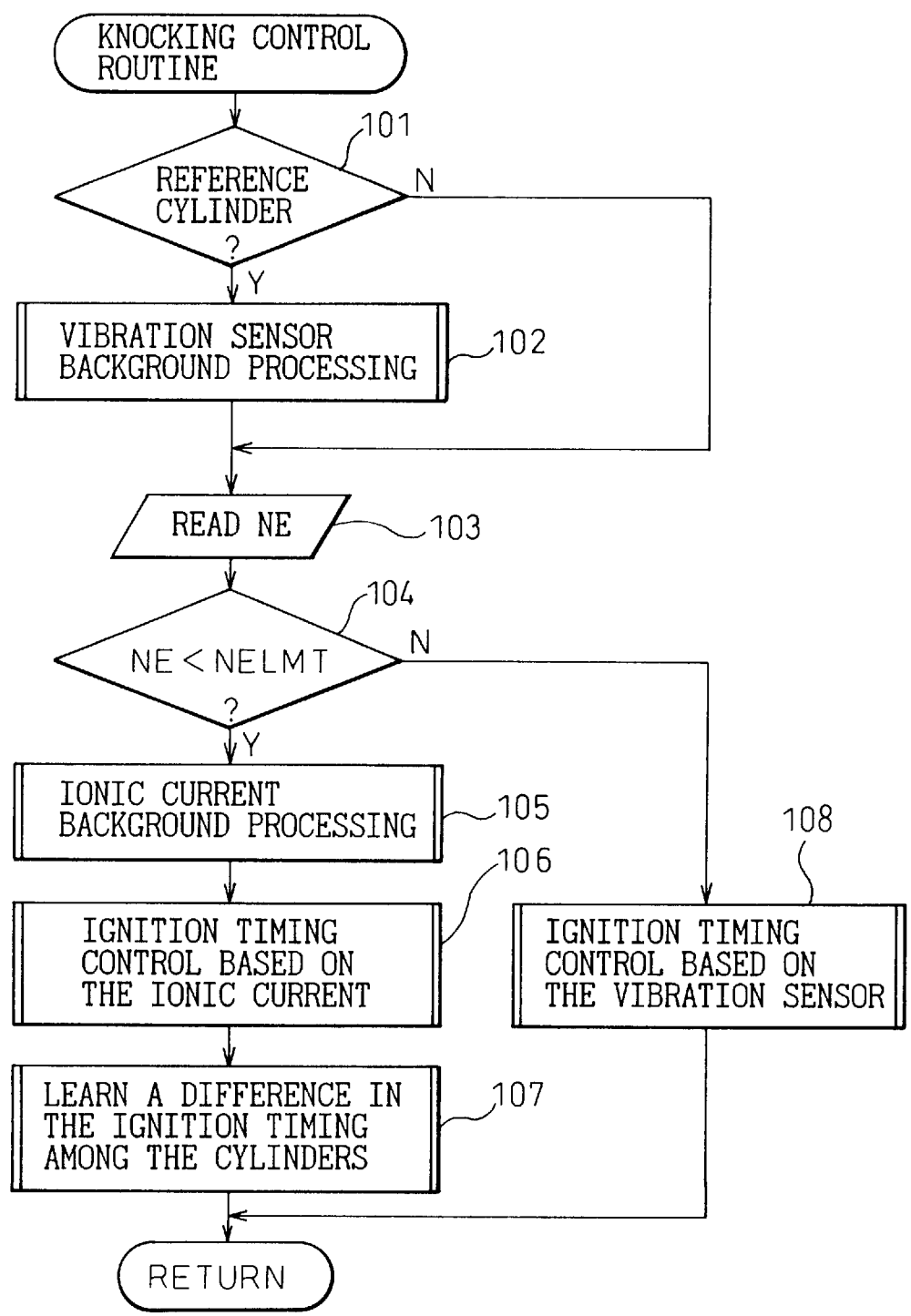
FIG. 7 is a flow chart illustrating a procedure for processing a knocking control routine according to the first embodiment.

FIG. 7 is a flow chart illustrating a procedure for processing a knocking control routine according to the first embodiment. This routine is executed by the CPU 43 for every predetermined crank angle for each of the cylinders. At a step 101, first, it is discriminated whether the processing is for a reference cylinder or not. When the processing is for the reference cylinder, the program proceeds to a step 102 where a vibration sensor background processing, that will be described later, is executed. The program then proceeds to a step 103. When the processing is for a cylinder other than the reference cylinder, the program proceeds directly to the step 103. The vibration sensor background processing is executed irrespective of the operation region in order to maintain continuity in the reference value for discriminating knocking based upon the vibration sensor output.

The step 103 reads a present engine rotational speed NE that is separately calculated based on the output of the crank angle sensor 44. Then, at a step 104, it is discriminated whether the rotational speed NE is smaller than a limit rotational speed NELMT at which it is no longer possible to detect the knocking based on the ionic current. When NE<NELMT, steps 105, 106 and 107 are executed to end the routine. Here, the step 105 executes the ionic current background processing, the step 106 executes the ignition timing control based upon the ionic current, and the step 107 learns a difference in the ignition timing among the cylinders, but their contents will be described later. When NELMT≦NE, the program proceeds to an ignition timing control (which will be described later) based upon the vibration sensor, and the routine ends.

Figure 8:
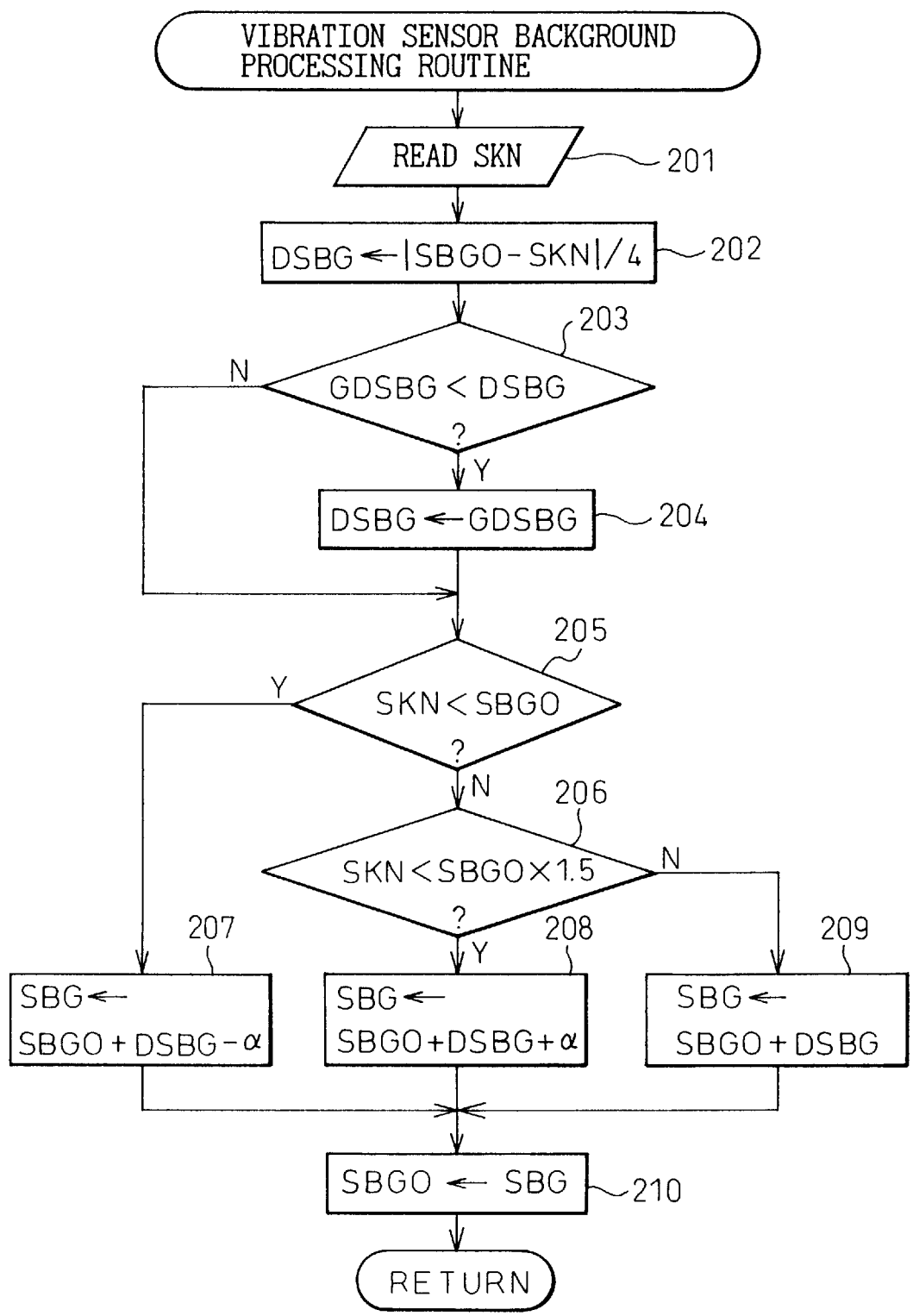
FIG. 8 is a flow chart illustrating a procedure of a vibration sensor background processing routine.

FIG. 8 is a flow chart illustrating the procedure of the vibration sensor background processing routine executed at the step 102 in the knocking control routine (FIG. 7). First, a step 201 reads an output SKN of the peak-holding circuit 47 which holds a peak output value of the vibration sensor 46. Then, at a step 202, an updating amount DSBG is calculated in compliance with

DSBG←|SBGO−SKN|/4.

Here, SBGO stands for a vibration sensor background calculated in the operation of the previous time. The updating amount DSBG is calculated as one-fourth of an absolute value of a difference between the vibration sensor background of the operations of up to the previous time and a peak value SKN of this time.

Then, at steps 203 and 204, the updating amount DSBG is limited and will not exceed a predetermined upper-limit guard value GDSBG. At steps 205 and 206, the peak value SKN of this time is compared with the vibration sensor background SBGO of up to the previous time to discriminate the magnitude of SKN. At steps 207, 208 and 209, the vibration sensor background SBG is updated depending upon the discriminated result. That is, SBG is calculated in a manner that:

SBG←SBGO+DSBG−α when SKN<SBGO

SBG←SBGO+DSBG+α when SBGO≦SKN<SBGO×1.5

SBG←SBGO+DSBG when SBGO×1.5≦SKN where α is an adjustment coefficient for placing the vibration sensor background SBG within a suitable range. At a final step 210, the vibration sensor background SBG calculated this time is stored as SBGO to be ready for the operation of the next time, and the routine ends.

Figure 9:
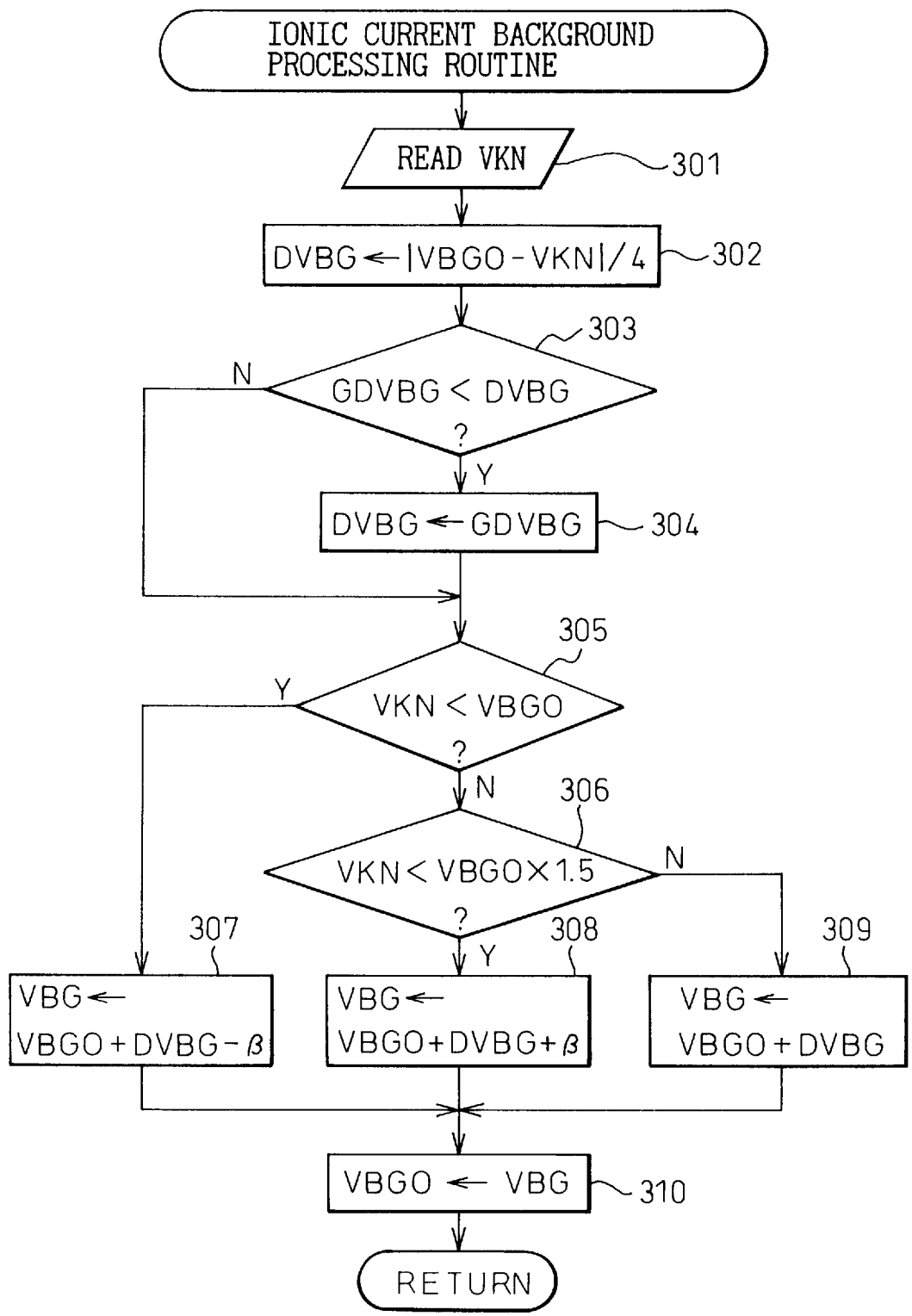
FIG. 9 is a flow chart illustrating a procedure of an ionic current background processing routine.

FIG. 9 is a flow chart illustrating a procedure of the ionic current background processing routine executed at the step 105 of the knocking control routine (FIG. 7). First, a step 301 reads an output VKN of the integrating circuit 42 which holds an integrated value of output of the BPF 41. Then, at a step 302, an updating amount DVBG is calculated in compliance with DVBG←|VBGO−VKN|/4 where VBGO stands for an ionic current background calculated in the operation of the previous time. The updating amount DVBG is calculated as one-fourth of an absolute value of a difference between the ionic current background of the operations of up to the previous time and an integrated value VKN of this time.

Then, at steps 303 and 304, the updating amount DVBG is so limited as will not exceed a predetermined upper-limit guard value GDVBG. Then, at steps 305 and 306, the integrated value VKN of this time is compared with the ionic current background VBGO of up to the previous time to discriminate the magnitude of VKN. At steps 307, 308 and 309, the ionic current background SBG is updated depending upon the discriminated result. That is, SBG is calculated in a manner that:

VBG←VBGO+DVBG−β when VKN<VBGO

VBG←VBGO+DVBG+β when VBGO≦VKN<VBGO×1.5

VBG←VBGO+DVBG when VBGO×1.5≦VKN where β is an adjustment coefficient for placing the ionic current background VBG within a suitable range. At a final step 310, the ionic current background VBG calculated this time is stored as VBGO to be ready for the operation of the next time, and the routine ends.

Figure 10:
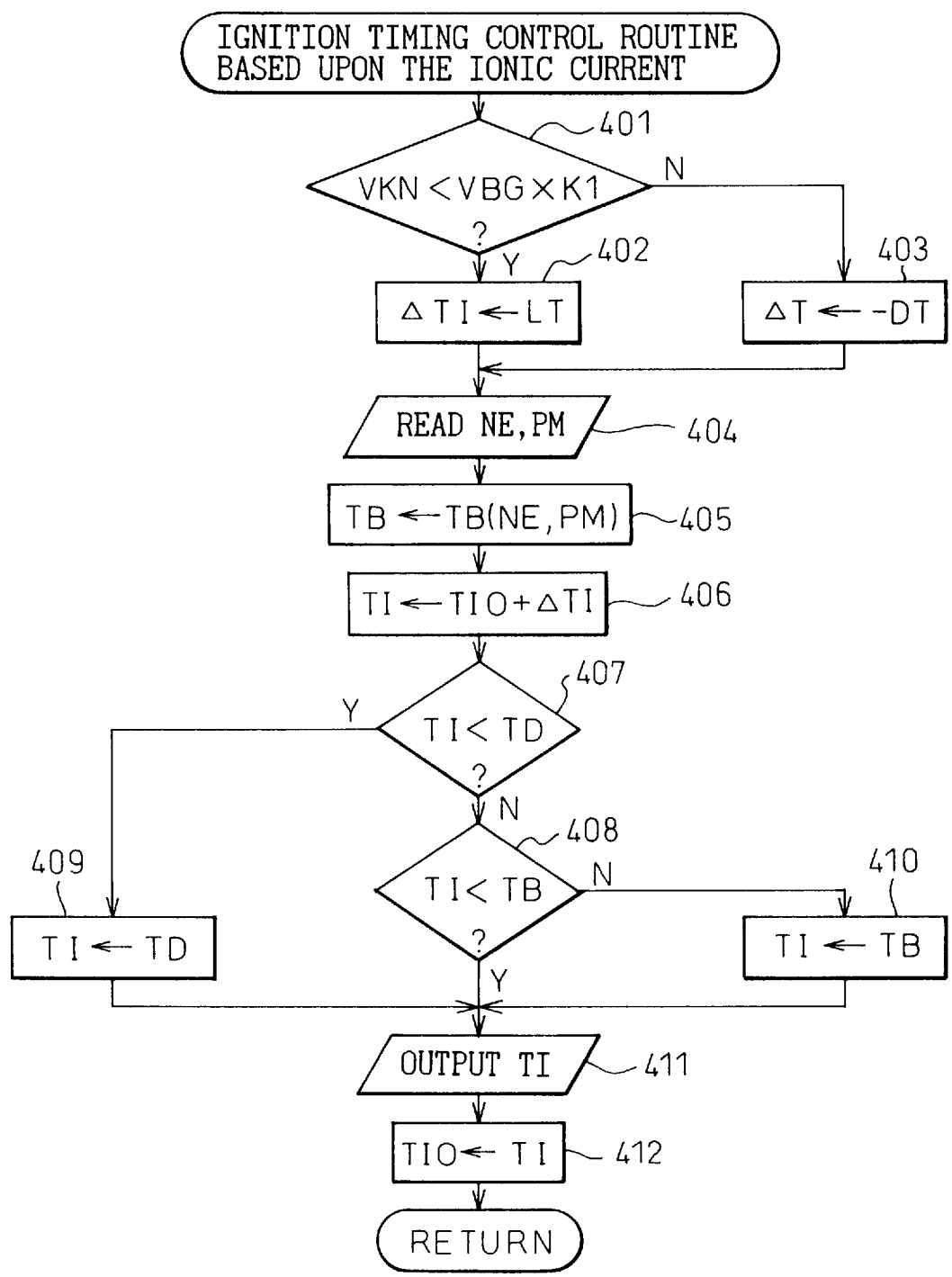
FIG. 10 is a flow chart illustrating a procedure for processing an ignition timing control routine based upon the ionic current.

FIG. 10 is a flow chart illustrating the procedure of an ignition timing control routine based upon the ionic current executed at the step 106 of the knocking control routine (FIG. 7). The ignition timing is expressed as a crank angular position before the top dead center in the compression stroke. At a step 401, first, it is discriminated whether an integrated value VKN of the ionic current output is smaller than a product of the background VBG and a predetermined coefficient K1. When VKN<VBG×K1, it is so regarded that no knocking has occurred, and the program proceeds to a step 402 where the ignition timing correction amount ΔTI is set to a predetermined advancing amount LT. On the other hand, when VBG×K1≦VKN, it is so regarded that knocking has occurred, and the program proceeds to a step 403 where the ignition timing correction amount ΔTI is set to a predetermined delay amount −DT. Here, a relationship 0<LT<<DT is maintained in order to gradually advance the ignition timing when no knocking is occurring but to delay the ignition at one time when knocking has occurred in order to suppress the knocking.

At a step 404 executed after the step 402 or 403, an engine rotational speed NE and an intake pipe pressure PM are read, the NE and PM being separately calculated based upon the output of the crank angle sensor 44 and the output of the intake pressure sensor 45. Then, at a step 405, reference is made to a predetermined map based upon NE and PM, in order to calculate a reference ignition timing TB based upon NE and PM. Then, at a step 406, the ignition timing correction amount ΔTI is added to an ignition timing TIO calculated from the running in the routine of the previous time in order to find the ignition timing TI of this time.

Then, at steps 407, 408, 409 and 410, it is discriminated whether the calculated ignition timing TI lies between a predetermined most delayed ignition timing TD and a reference ignition timing TB which is the most advanced ignition timing. When the calculated ignition timing TI does not lie therebetween, the ignition timing TI is set again to the most delayed ignition timing TD or to the reference ignition timing TB. At a step 411, an ignition signal is formed depending upon the ignition timing TI and is output. At a final step 412, the ignition timing TI calculated this time is stored as TIO to be ready for the operation of the next time.

Figure 11:
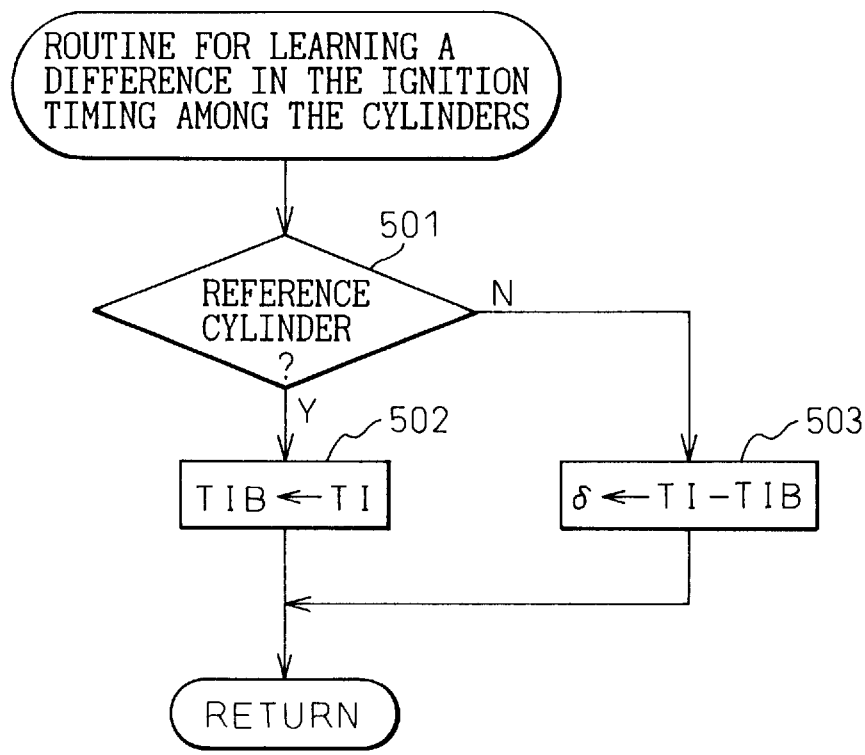
FIG. 11 is a flow chart illustrating a procedure for processing a routine for learning a difference in the ignition timing among the cylinders.

FIG. 11 is a flow chart illustrating a procedure for processing the routine for learning a difference in the ignition timing among the cylinders executed at the step 107 of the knocking control routine (FIG. 7). At a step 501, first, it is determined whether the running of the routine of this time is to execute the processing related to the reference cylinder or not. When it is the processing related to the reference cylinder, the program proceeds to a step 502 where the ignition timing TIB for the reference cylinder is set to the present ignition timing TI, and the routine ends. When it is the processing related to a cylinder other than the reference cylinder, the program proceeds to a step 503 where a difference δ in the ignition timing is found according to the operation "TI−TIB", and the routine ends. The difference δ is a variable provided for each of the cylinders other than the reference cylinder.

Figure 12:
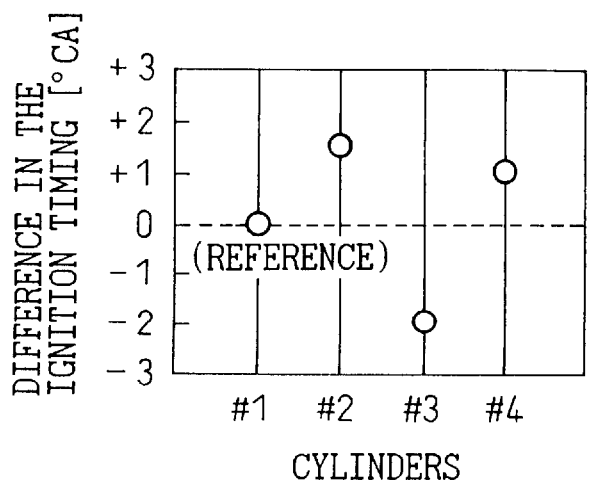
FIG. 12 is a graph illustrating a difference in the ignition timing among the cylinders.

FIG. 12 is a graph illustrating a difference in the ignition timing among the cylinders, wherein the abscissa represents the cylinders and the ordinate represents a difference in the ignition timing as indicated by a crank angle. In this example, the cylinder #1 is a reference cylinder and, hence, a difference in the ignition timing for the cylinder #1 is 0° CA. The cylinder #2 is advanced by 1.5° CA and the cylinder #4 is advanced by 1.0° CA, and the cylinder #3 is delayed by 2.0° CA with respect to the ignition timing for the cylinder #1.

Figure 13:
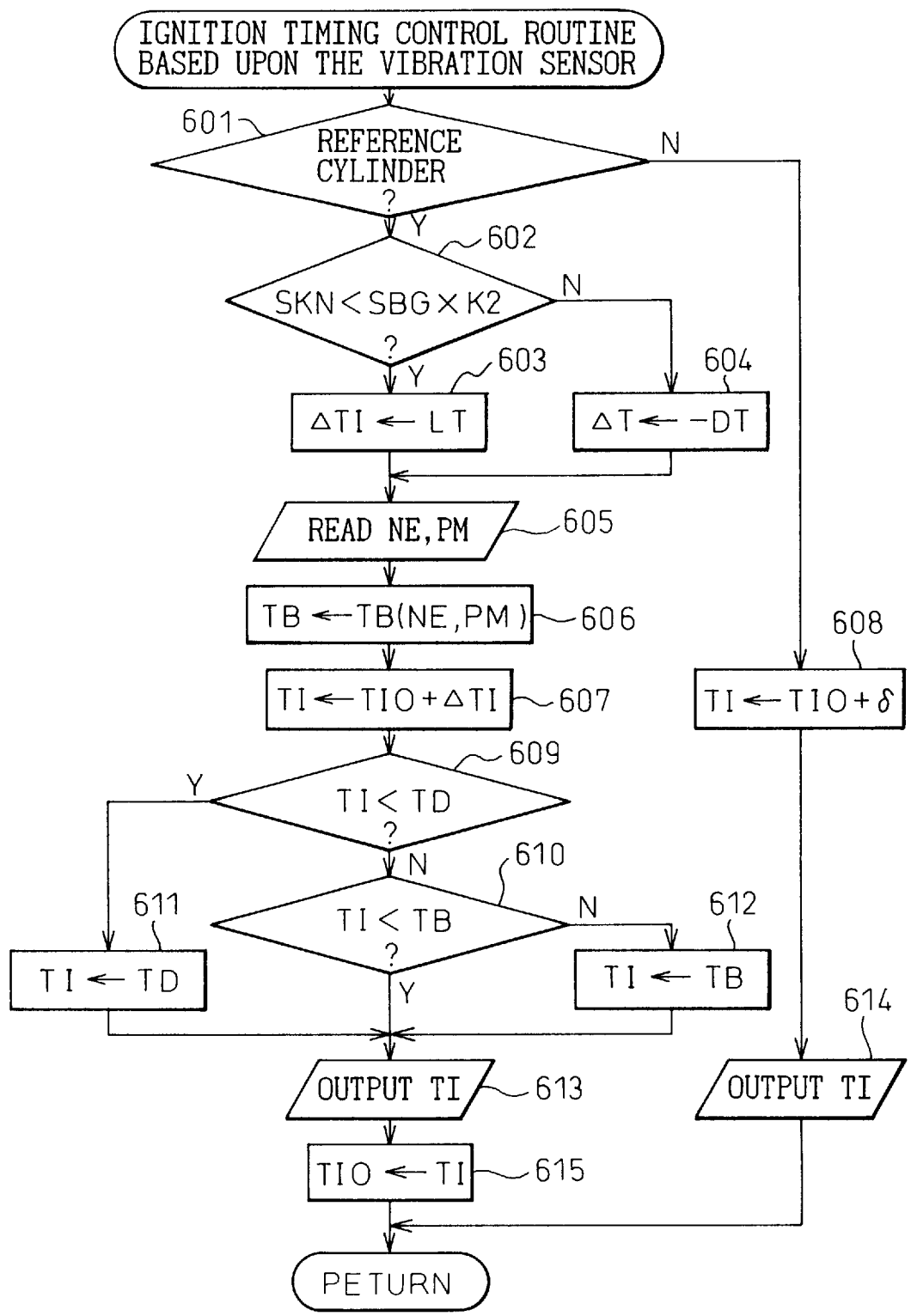
FIG. 13 is a flow chart illustrating a procedure for processing an ignition timing control routine based upon the vibration sensor.

FIG. 13 is a flow chart illustrating a procedure for processing the ignition timing control routine based upon the vibration sensor executed at the step 108 of the knocking control routine (FIG. 7). At a step 601, first, it is discriminated whether the running of the routine of this time is to execute the processing related to the reference cylinder or not. When it is the processing related to the reference cylinder, the program proceeds to a step 602. When it is the processing related to a cylinder other than the reference cylinder, the program proceeds to a step 608.

At a step 602, it is discriminated whether a peak value SKN of the vibration sensor output is smaller than a product of the background SBG and a predetermined coefficient K2 or not. When SKN<SBG×K2, it is so regarded that no knocking is occurring and the program proceeds to a step 603 where the ignition timing correction amount ΔTI is set to a predetermined advancing amount LT. When SBG× K2≦SKN, on the other hand, it is so regarded that knocking has occurred, and the program proceeds to a step 604 where the ignition timing correction amount ΔTI is set to a predetermined delay amount −DT. Here, a relationship 0<LT<<DT is maintained in order to gradually advance the ignition timing when no knocking is occurring but to delay the ignition timing at once when knocking has occurred in order to suppress the knocking.

At a step 605 executed after the step 603 or 604, an engine rotational speed NE and an intake pipe pressure PM are read, the NE and PM being separately calculated based upon the output of the crank angle sensor 44 and the output of the intake pressure sensor 45. Then, at a step 606, reference is made to a predetermined map based upon NE and PM, in order to calculate a reference ignition timing TB based upon NE and PM. Then, at a step 607, the ignition timing correction amount ΔTI is added to an ignition timing TIO calculated from the running in the routine of the previous time in order to find an ignition timing TI of this time.

Then, at steps 609, 610, 611 and 612, it is discriminated whether the calculated ignition timing TI lies between a predetermined most delayed ignition timing TD and a reference ignition timing TB which is the most advanced ignition timing. When the calculated ignition timing TI does not lie therebetween, the ignition timing TI is set again to the most delayed ignition timing TD or to the reference ignition timing TB. At a step 613, an ignition signal is formed depending upon the ignition timing TI and is output. At a final step 615, the ignition timing TI calculated this time is stored as TIO to be ready for the operation of the next time.

On the other hand, at a step 608 that is executed in the case when it is discriminated at the step 601 that the running of the routine of this time is a processing related to a cylinder other than the reference cylinder, the ignition timing TIO for the reference cylinder is corrected by a difference δ in the ignition timing calculated, for each of the cylinders, by the routine for learning a difference in the ignition timing among the cylinders (FIG. 11), in order to determine the ignition timing TI for the cylinder. Then, at a step 614, an ignition signal is formed depending upon the ignition timing TI and is output to end the routine.

Described below is the knocking control according to the second embodiment. According to the second embodiment, knocking is controlled based upon the vibration sensor when the internal combustion engine is in the low-load operation region where it is difficult to separate the knocking vibration components from the combustion variation noise. When the internal combustion engine is in another operation region, knocking is controlled based upon the ionic current.

Figure 14:
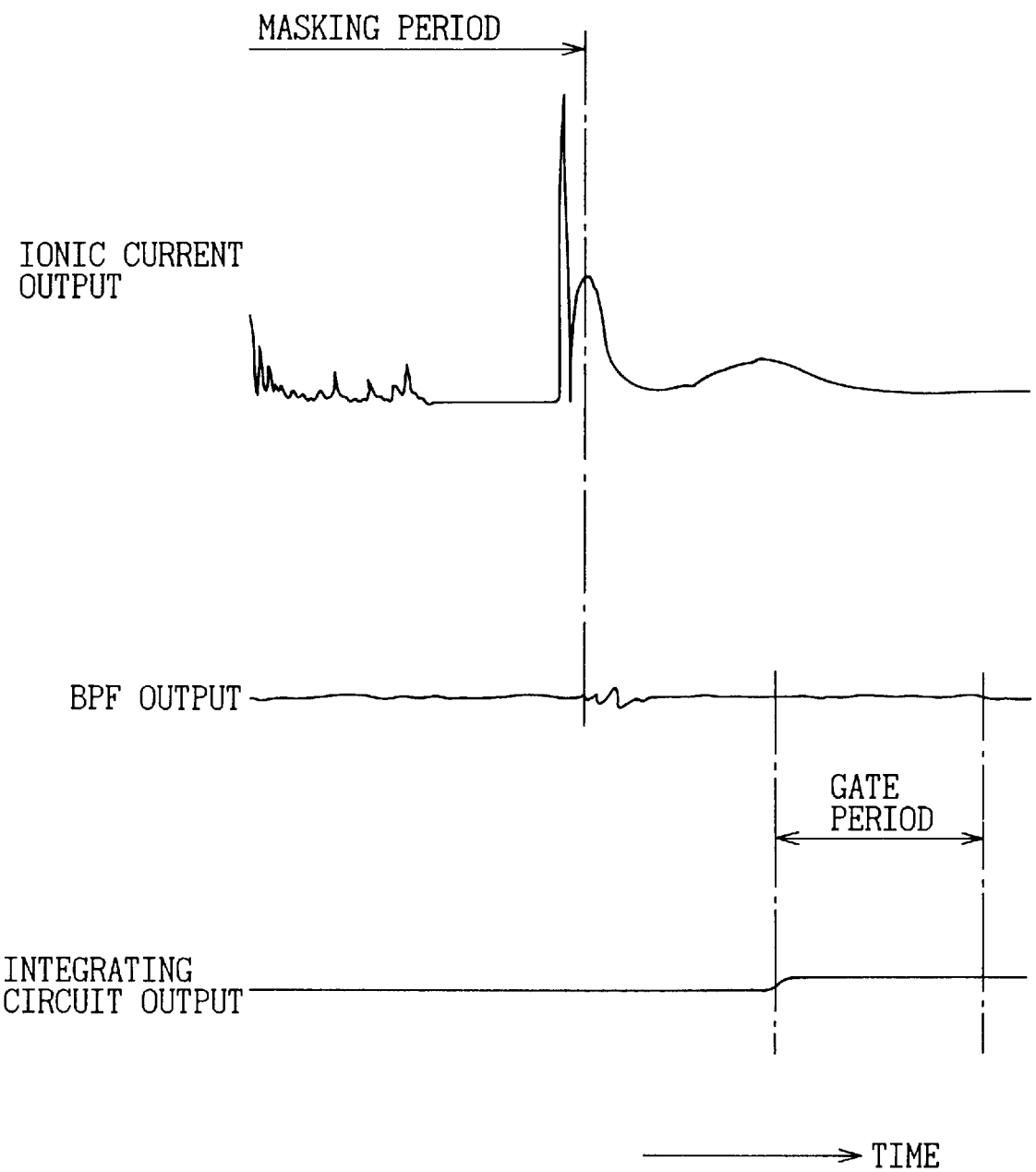
FIG. 14 is a time chart of an ionic current output signal, a BPF output signal and an integrating circuit output signal of when the combustion is stable and no knocking is occurring.
Figure 15:
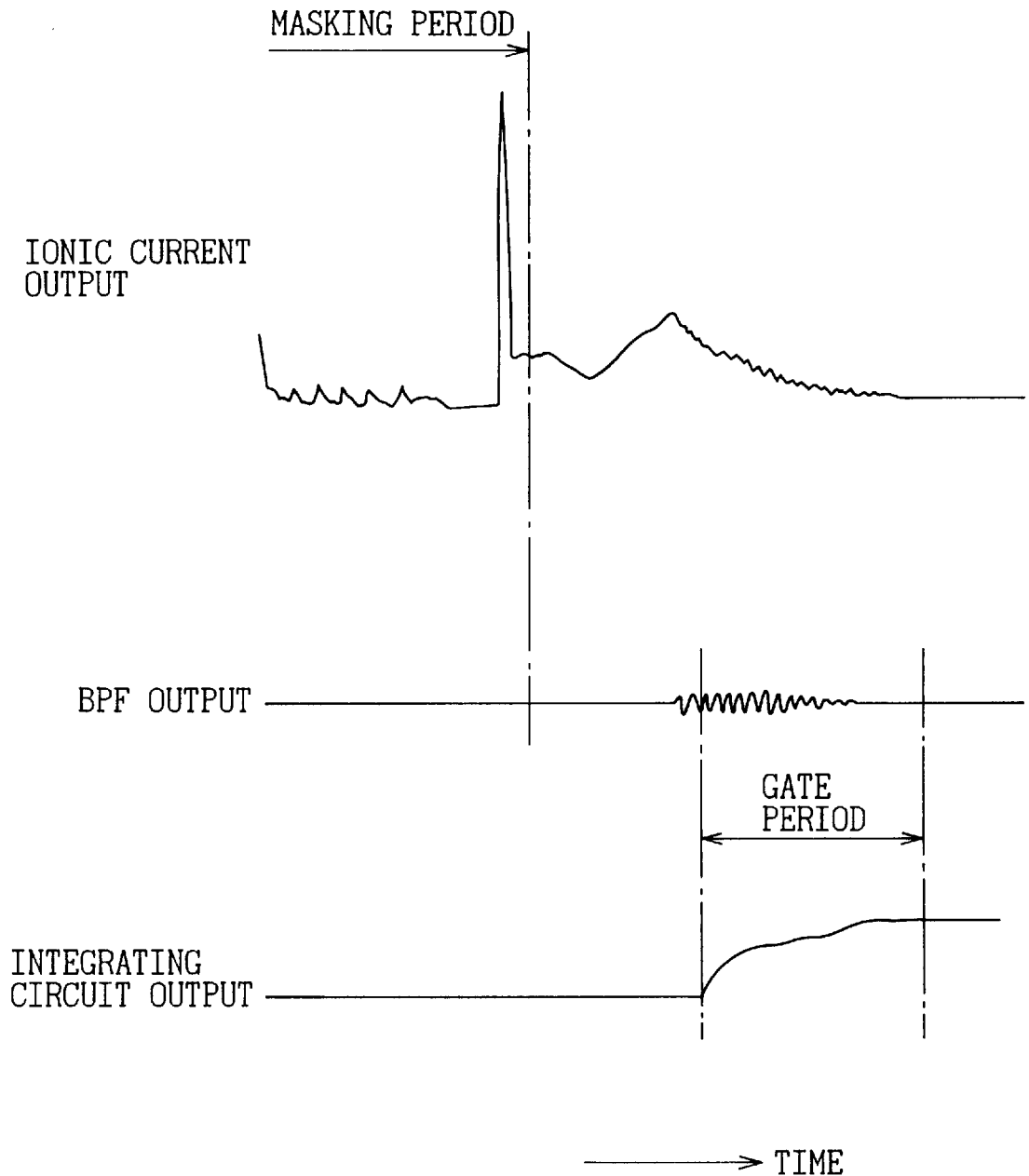
FIG. 15 is a time chart of an ionic current output signal, a BPF output signal and an integrating circuit output signal of when knocking is occurring.
Figure 16:
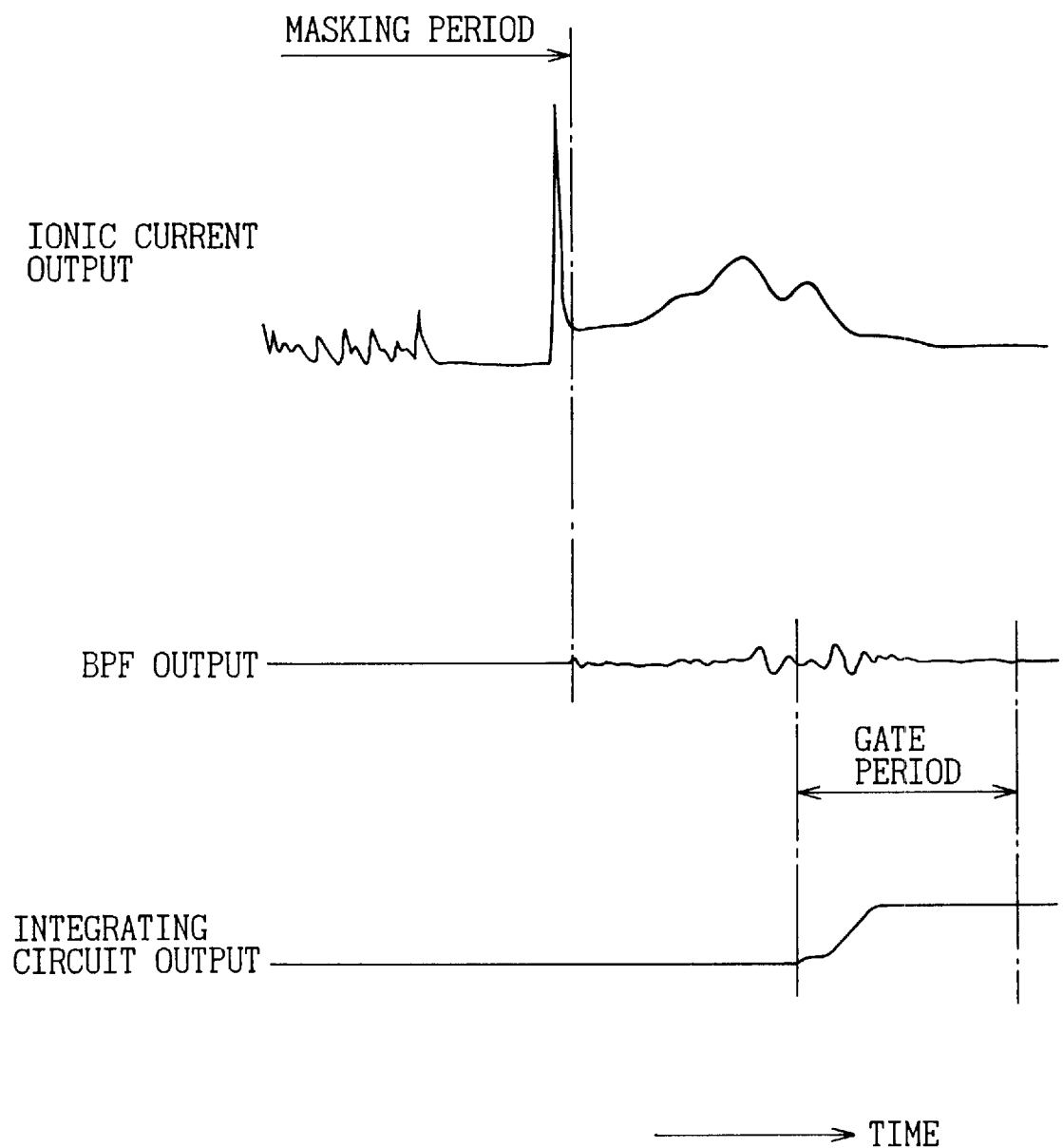
FIG. 16 is a time chart of an ionic current output signal, a BPF output signal and an integrating circuit output signal of when no knocking is occurring but the combustion is not stable.

FIGS. 14, 15 and 16 are time charts of an ionic current output signal, a BPF output signal and an integrating circuit output signal in the circuit for detecting knocking based upon the ionic current, wherein FIG. 14 is that of when the load is large, the combustion is stable and no knocking is occurring, FIG. 15 is that of when knocking is occurring, and FIG. 16 is that of when no knocking is occurring, but the load is small, EGR is executed, and the combustion is not stable. The ionic current output that appears after the end of a steep LC resonance noise is a low-frequency signal in synchronism with the pressure in the cylinder. In the case of FIG. 14, the ionic current output contains neither the vibration component due to knocking nor the vibration component due to variation in the combustion, and only a small integrated value is obtained despite the BPF output being integrated during the gate period in which it is expected that the knocking vibration component may be generated.

When knocking occurs, on the other hand, the knocking vibration component is superposed on the ionic current output after a maximum pressure in the cylinder as shown in FIG. 15. As the knocking vibration components are picked up by the BPF, there is obtained a large integrated value making it possible to detect the knocking. When the combustion is not stable, however, the ionic current output assumes an irregular waveform containing vibration components of 1 to 7 kHz even though no knocking is occurring as shown in FIG. 16. Accordingly, the BPF output appears as a signal having a large amplitude. As a result, the output of the integrating circuit becomes so large that it is erroneously detected as the occurrence of knocking.

Figure 17A:
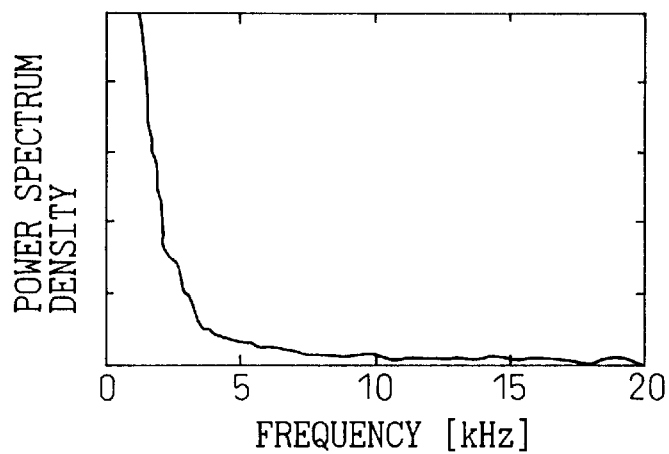
FIGS. 17A, 17B and 17C are diagrams of characteristics showing the ionic current output signals of FIGS. 14, 15 and 16 over a frequency region by the FFT (fast Fourier transform) analysis.
Figure 17B:
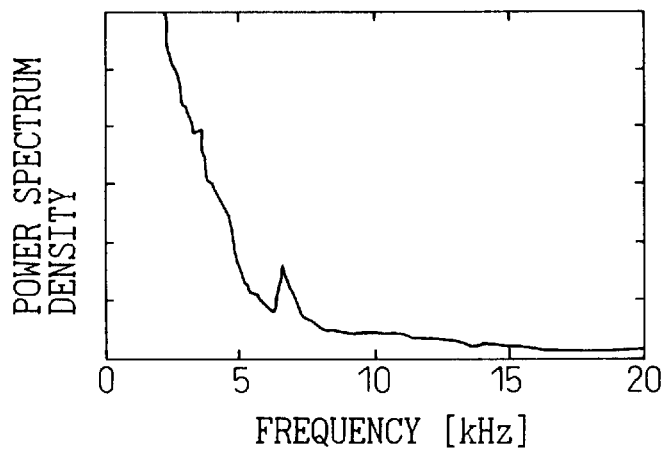
Figure 17C:
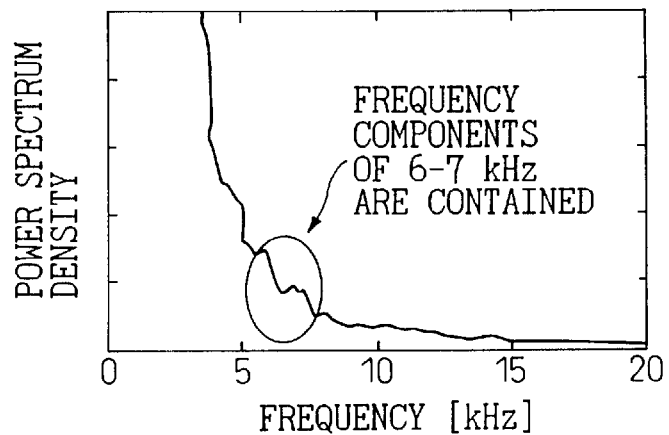

FIGS. 17A, 17B and 17C are diagrams of characteristics showing the ionic current output signals of FIGS. 14, 15 and 16 over a frequency region by the FFT (fast Fourier transform) analysis, wherein the abscissa represents the frequency and the ordinate represents the power spectrum density. As will be obvious from these drawings, when knocking occurs (FIG. 17B), the frequency components of 6 to 7 kHz appear conspicuous compared with when no knocking occurs (FIG. 17A). However, the frequency components of 6 to 7 kHz are also contained in considerably large amounts even when the combustion is not stable though no knocking is occurring (FIG. 17C). When there exists the combustion variation noise, therefore, it is difficult to pick up only the knocking vibration components from the ionic current output.

Figure 18A:
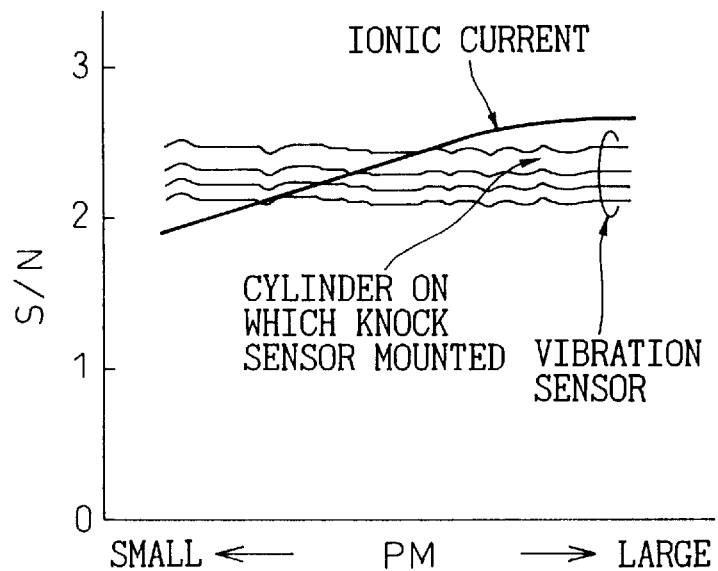
FIGS. 18A and 18B are diagrams of characteristics for detecting knocking relying upon the ionic current and upon the vibration sensor in a low rotational speed region and in a high rotational speed region.
Figure 18B:
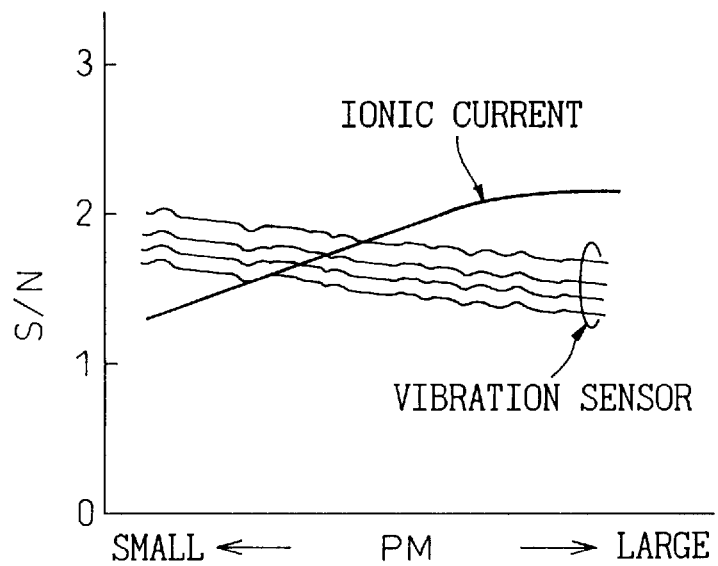

FIGS. 18A and 18B are diagrams of characteristics for detecting the knocking relying upon the ionic current and upon the vibration sensor in a low rotational speed region and in a high rotational speed region, and wherein the abscissa represents the intake pipe pressure PM as the engine load and the ordinate represents the SN ratio. Referring to the low rotational speed region shown in FIG. 18A, the SN ratio based on the vibration sensor remains stable throughout the whole load region but fluctuates among the cylinders. On the other hand, the SN ratio based on the ionic current decreases in the low load region but does not fluctuate among the cylinders. Referring to the high rotational speed region shown in FIG. 18B, the SN ratio based on the vibration sensor becomes lower than that of in the low rotational speed region, and fluctuates between the cylinders to such an extent that the signals can hardly be almost detected from the remote cylinders. On the other hand, the SN ratio based on the ionic current decreases in the low load region but does not fluctuate among the cylinders. Therefore, the detection precision in the high load region is superior to that of the vibration sensor.

In the high load region according to the second embodiment, therefore, knocking is controlled based upon the ionic current and, besides, a difference in the ignition timing is found between the ignition timing for the reference cylinder and the ignition timing for a cylinder other than the reference cylinder. In the low load operation region, on the other hand, knocking is controlled based upon the vibration sensor. In this case, however, the ignition timing is calculated based upon the output of the vibration sensor for the reference cylinder whereas for a cylinder other than the reference cylinder, the calculated ignition timing for the reference cylinder is corrected by the difference in the ignition timing thereby to calculate an ignition timing.

Figure 19:
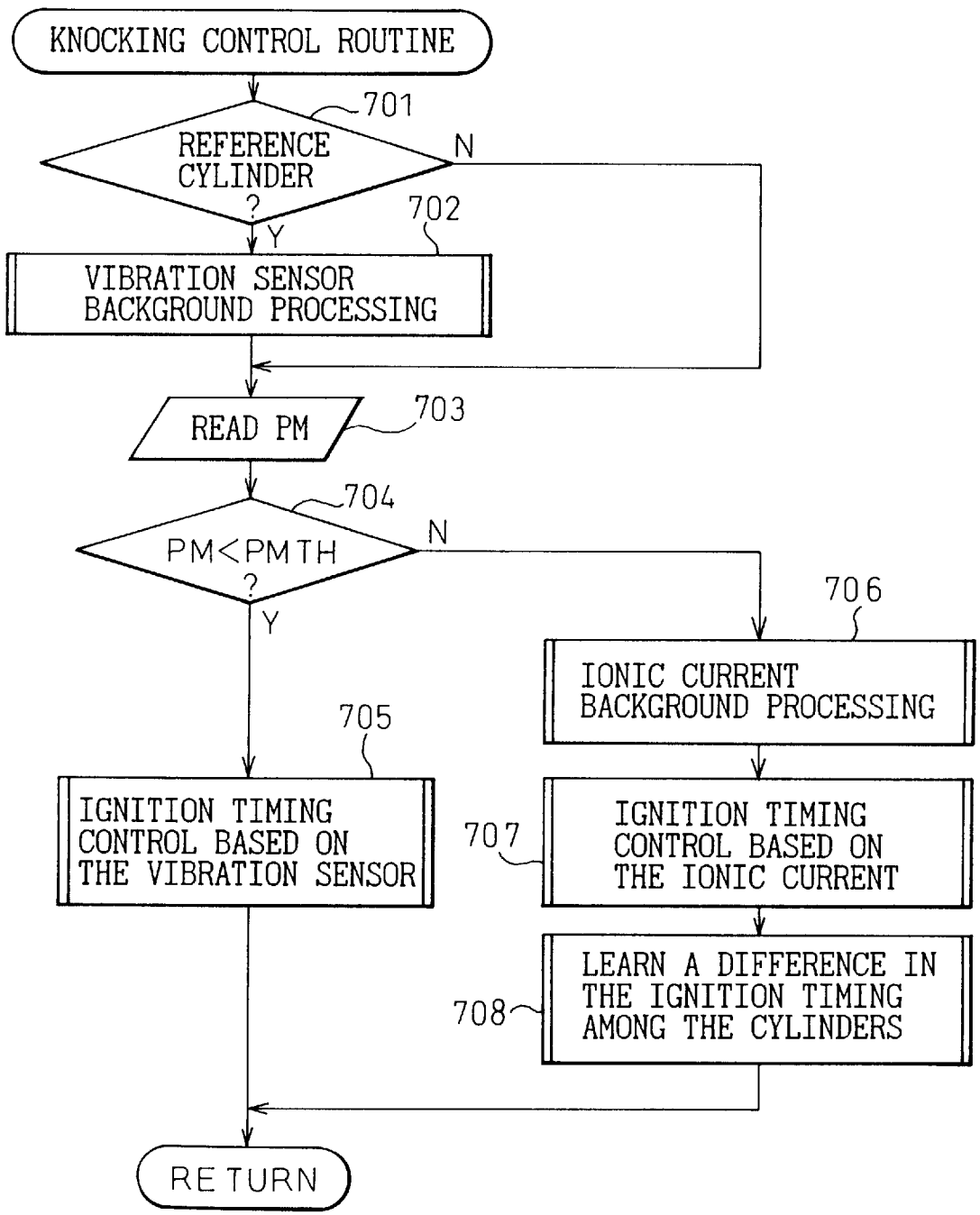
FIG. 19 is a flow chart illustrating a procedure for processing the knocking control routine according to a second embodiment.

FIG. 19 is a flow chart illustrating a procedure for processing the knocking control routine according to the second embodiment. At a step 701, first, it is discriminated whether the processing is for the reference cylinder or not. When the processing is for the reference cylinder, the program proceeds to a step 702 where the above-mentioned vibration sensor background processing (FIG. 8) is executed and, then, proceeds to a step 703. When the processing is for a cylinder other than the reference cylinder, on the other hand, the program directly proceeds to the step 703. The step 703 reads the present intake pipe pressure PM that has been separately calculated based on the output of the intake pressure sensor 45.

At a step 704, it is discriminated whether the intake pipe pressure PM is smaller than the intake pipe pressure PMTH which is a threshold value at which it becomes difficult to detect knocking based upon the ionic current due to the generation of combustion variation noise. When PM<PMTH, i.e., when the load is small, the program proceeds to a step 705 where the ignition timing is controlled based on the vibration sensor (FIG. 13) to end the routine. When PMTH≦PM, i.e., when the load is large, on the other hand, the above-mentioned ionic current background processing is executed (FIG. 9), the ignition timing is controlled based upon the ionic current (FIG. 10), and a difference in the ignition timing among the cylinders is learned (FIG. 11)(steps 706, 707 and 708).

Next, described below is the knocking control according to a third embodiment. The third embodiment takes into consideration the fact that the SN ratio of the vibration sensor for detecting the knocking decreases due to mechanical noise during high rotational speed running and that combustion variation noise is generated during low rotational speed running. That is, according to the third embodiment, the knocking is controlled based upon the ionic current in the high rotational speed region and, besides, a difference in the ignition timing is calculated between the ignition timing for the reference cylinder and the ignition timing for a cylinder other than the reference cylinder. In the low rotational speed region, on the other hand, knocking is controlled based upon the vibration sensor. For the reference cylinder in this case, the ignition timing is calculated based upon the output of the vibration sensor. For a cylinder other than the reference cylinder, on the other hand, the calculated ignition timing for the reference cylinder is corrected by the difference in the ignition timing to calculate an ignition timing.

Figure 20:
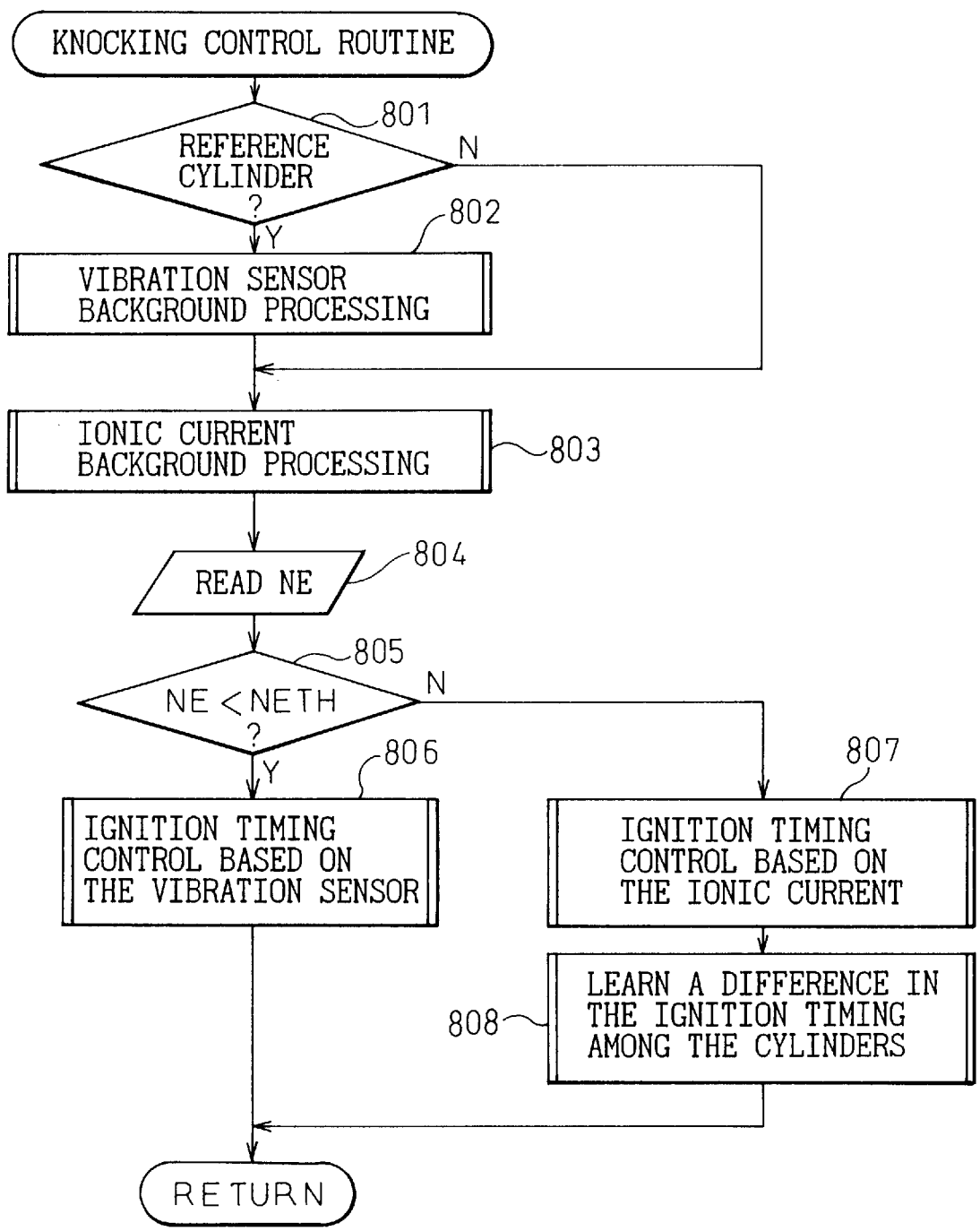
FIG. 20 is a flow chart illustrating a procedure for processing the knocking control routine according to a third embodiment.

FIG. 20 is a flow chart illustrating a procedure for processing the knocking control routine according to the third embodiment. At a step 801, first, it is determined whether the processing is for the reference cylinder. When the processing is for the reference cylinder, the program proceeds to a step 802 where the above-mentioned vibration sensor background processing (FIG. 8) is executed and, then, proceeds to a step 803. When the processing is for a cylinder other than the reference cylinder, the program directly proceeds to the step 803. At the step 803, the above-mentioned ionic current background processing (FIG. 9) is executed. Then, at a step 804, the present rotational speed NE is read.

At a step 805, it is discriminated whether the rotational speed NE is smaller than the rotational speed NETH which is a threshold value at which it becomes difficult to detect knocking based on the vibration sensor due to the generation of mechanical noise. When NE<NETH, the program proceeds to a step 806 where the ignition timing is controlled based upon the vibration sensor (FIG. 13) and the routine ends. When NETH≦NE, the ignition timing is controlled based upon the ionic current (FIG. 10) and a difference in the ignition timing among the cylinders is learned (FIG. 11) (steps 807 and 808).

Described below next is the knocking control according to the fourth embodiment. According to the fourth embodiment, knocking is accurately controlled based on the combination of the second embodiment and the third embodiment. That is, whether the knocking control based upon the ionic current be executed or the knocking control based upon the vibration sensor is to be executed, is determined depending upon the engine rotational speed NE and the engine load (intake pipe pressure) PM.

Figure 21:
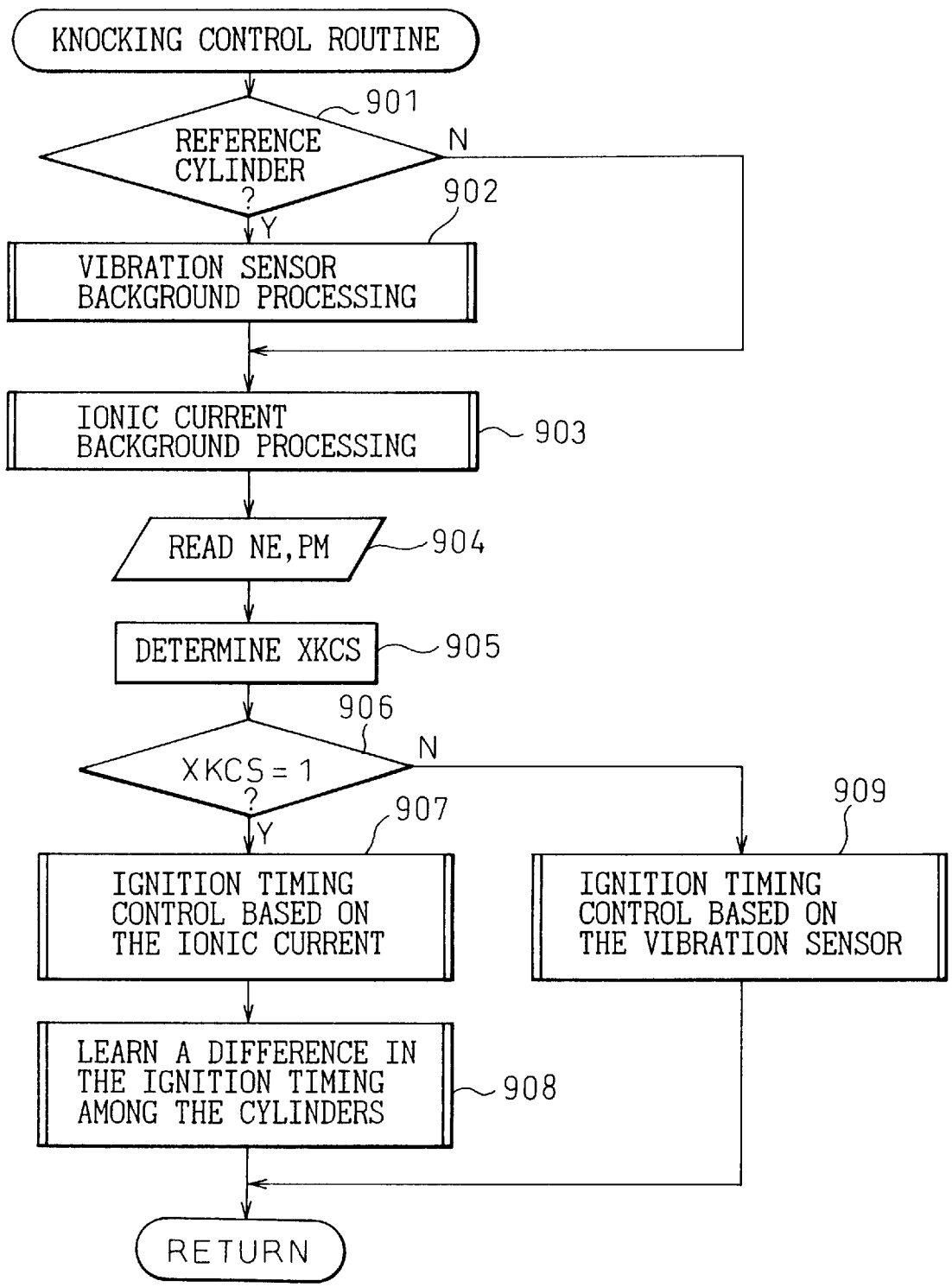
FIG. 21 is a flow chart illustrating a procedure for processing the knocking control routine according to a fourth embodiment.
Figures 22, 23:
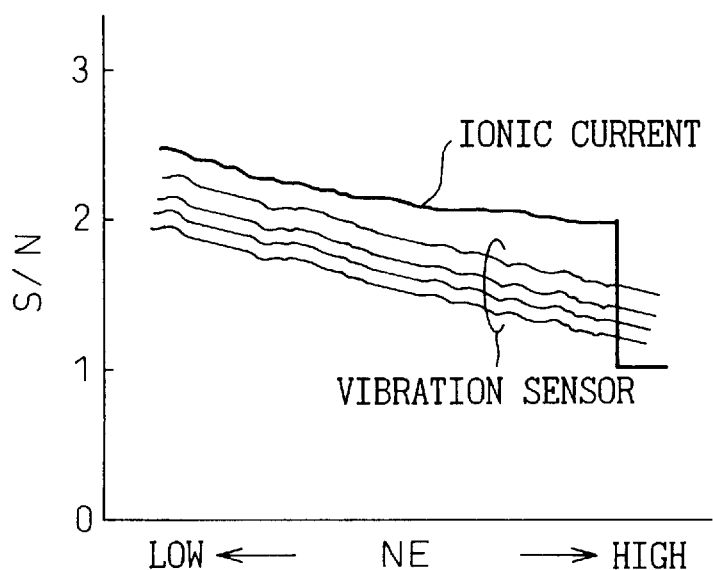
FIG. 22 is a diagram of a map defining knock control selection parameters XKCS depending upon the engine rotational speed NE and the pressure PM in the intake pipe.
FIG. 23 is a diagram of characteristics showing a relationship between the engine rotational speed NE and the SN ratio in knocking detection in a high-load region.

FIG. 21 is a flow chart illustrating a procedure for processing the knocking control routine according to the fourth embodiment, and FIG. 22 is a diagram of a map determining the knocking control selection parameters XKCS depending upon the engine rotational speed NE and the intake pipe pressure PM. Here, XKCS=1 represents that knocking be controlled based upon the ionic current and XKCS=0 represents that knocking be controlled based upon the vibration sensor. At a step 901, first, it is determined whether the processing is for the reference cylinder or not. When it is the processing for the reference cylinder, the program proceeds to a step 902 where the vibration sensor background processing (FIG. 8) is executed and then proceeds to a step 903. When the processing is for a cylinder other than the reference cylinder, the program directly proceeds to the step 903. At the step 903, the ionic current background processing (FIG. 9) is executed.

Then, at a step 904, the present rotational speed NE and the intake pipe pressure PM are read. Then, at a step 905, reference is made to the map of FIG. 22 based upon NE and PM to find a knocking control selection parameter XKCS. At a step 906, the value XKCS is determined. When XKCS=1, the ignition timing is controlled based upon the ionic current (FIG. 10) and a difference in the ignition timing among the cylinders is learned (FIG. 11) (steps 907 and 908). When XKCS=0, on the other hand, the ignition timing is controlled based upon the vibration sensor (FIG. 13)(step 909).

Next, described below is the knocking control according to the fifth embodiment. In the fifth embodiment, the processing of the first embodiment is added to the fourth embodiment. FIG. 23 is a diagram of characteristics illustrating a relationship between the engine rotational speed NE and the SN ratio for detecting knocking in the high load region. Even in the high load region, the LC resonance noise enters into the period in which knocking occurs as the rotational speed increases and, hence, the SN ratio for detecting knocking based upon the ionic current greatly decreases. According to the fifth embodiment, therefore, the fourth embodiment is so modified as to control knocking based upon the vibration sensor when the rotational speed NE exceeds a limit rotational speed NELMT at which it becomes difficult to detect knocking relying upon the ionic current.

Figure 24:
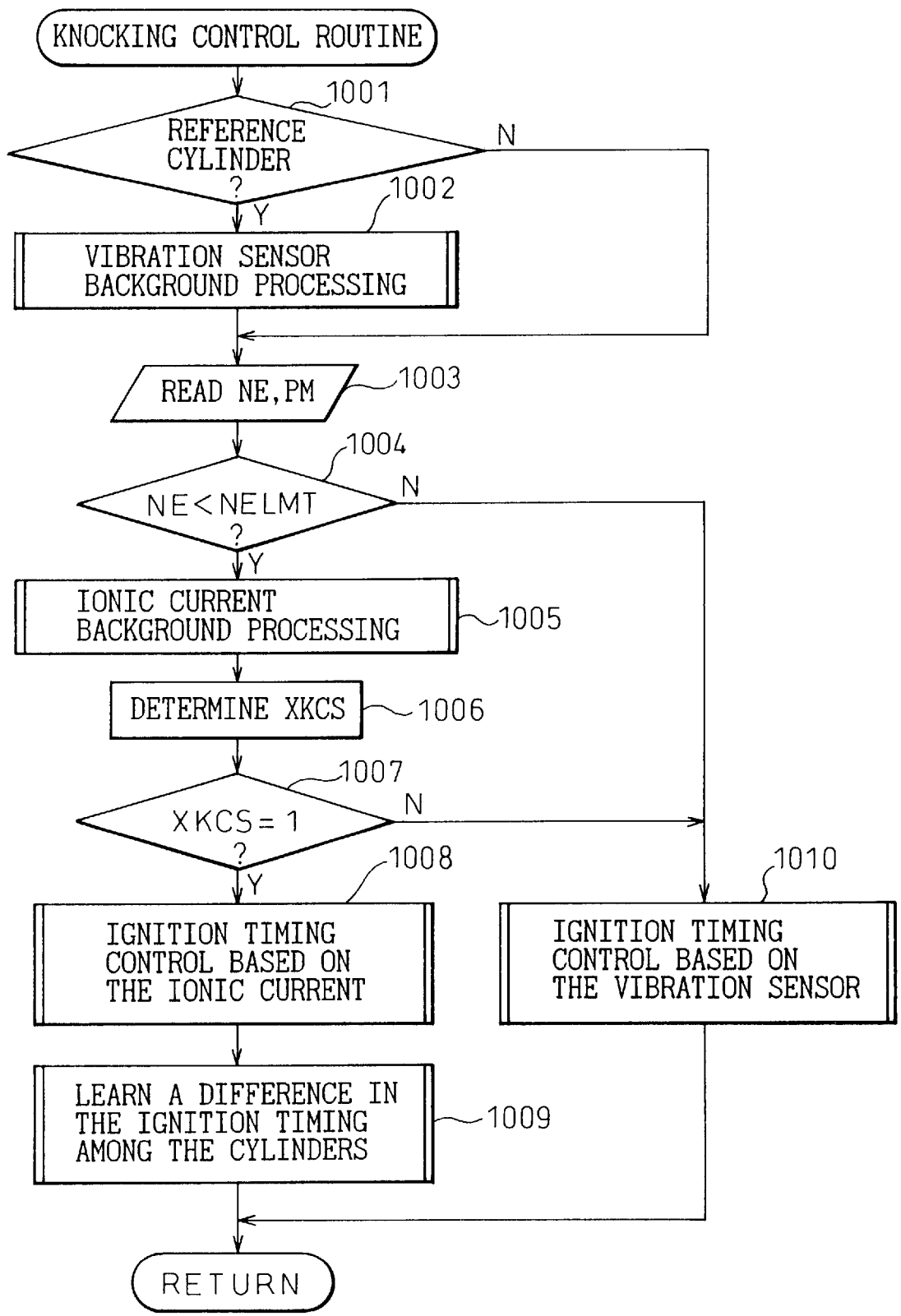
FIG. 24 is a flow chart illustrating a procedure for processing the knocking control routine according to a fifth embodiment.

FIG. 24 is a flow chart illustrating a procedure for processing the knocking control routine according to the fifth embodiment. Described below are only the differences from the fourth embodiment (FIG. 21). As shown at the steps

1004 and 1010, the ignition timing is controlled based upon the vibration sensor (FIG. 13) when the rotational speed NE exceeds the limit value NELMT. Furthermore, the ionic current background processing (FIG. 9) is executed in the region where NE<NELMT (step 1005).

Finally, described below is the knocking control according to the sixth embodiment. According to the fifth embodiment, knocking is controlled based upon the vibration sensor when the rotational speed NE exceeds the limit rotational speed NELMT. In this case, however, it may often become difficult to detect knocking based upon the vibration sensor being affected by mechanical noise. In such a case, it is desired to set the ignition timing to a fixed timing on the delay side to maintain safety.

Figure 25:
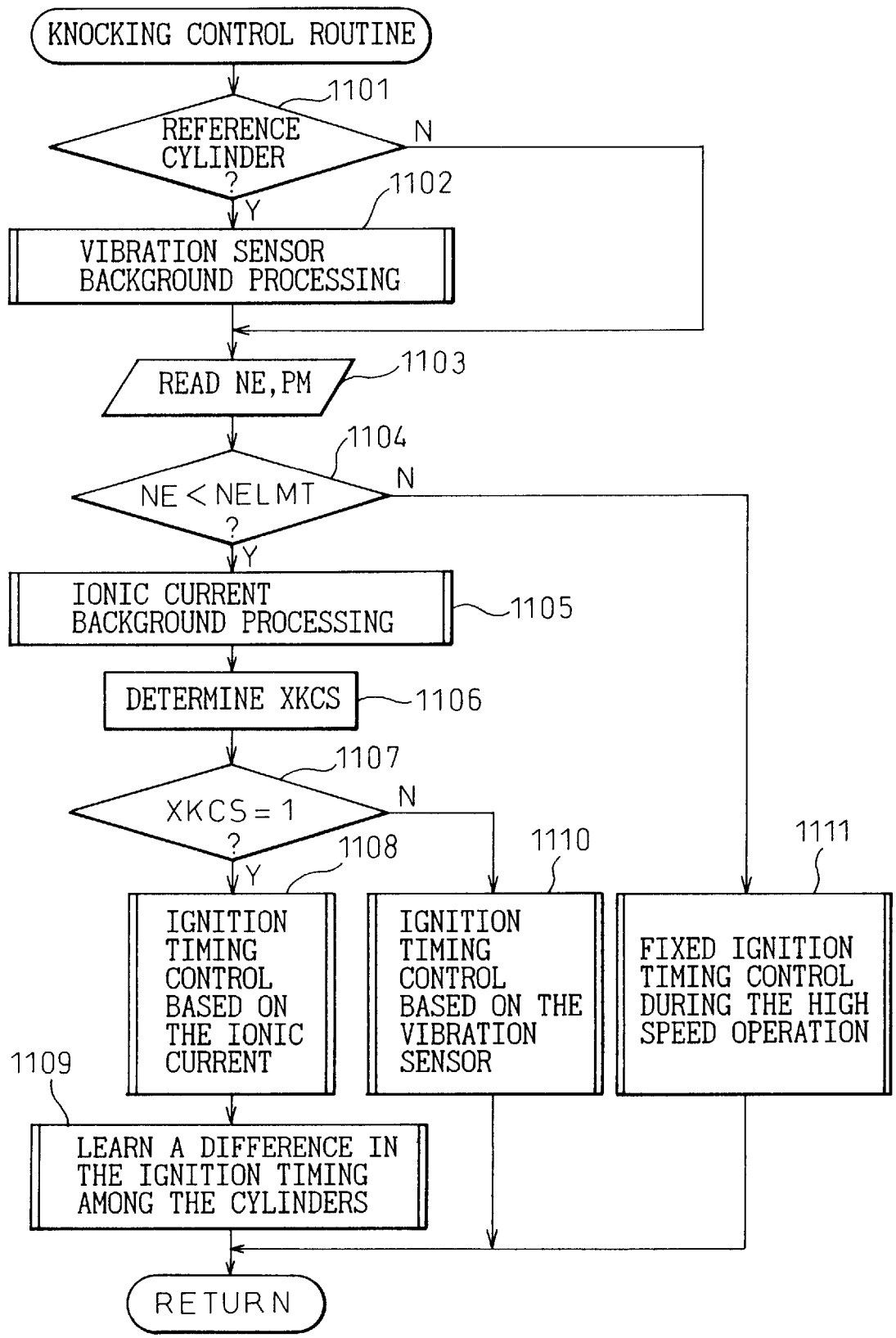
FIG. 25 is a flow chart illustrating a procedure for processing the knocking control routine according to a sixth embodiment.

FIG. 25 is a flow chart illustrating a procedure for processing the knocking control routine according to the sixth embodiment. Unlike the fifth embodiment (FIG. 24), the next fixed ignition timing control is executed during the high speed operation in the region where NE<NELMT (step 1111).

Figures 26, 27:
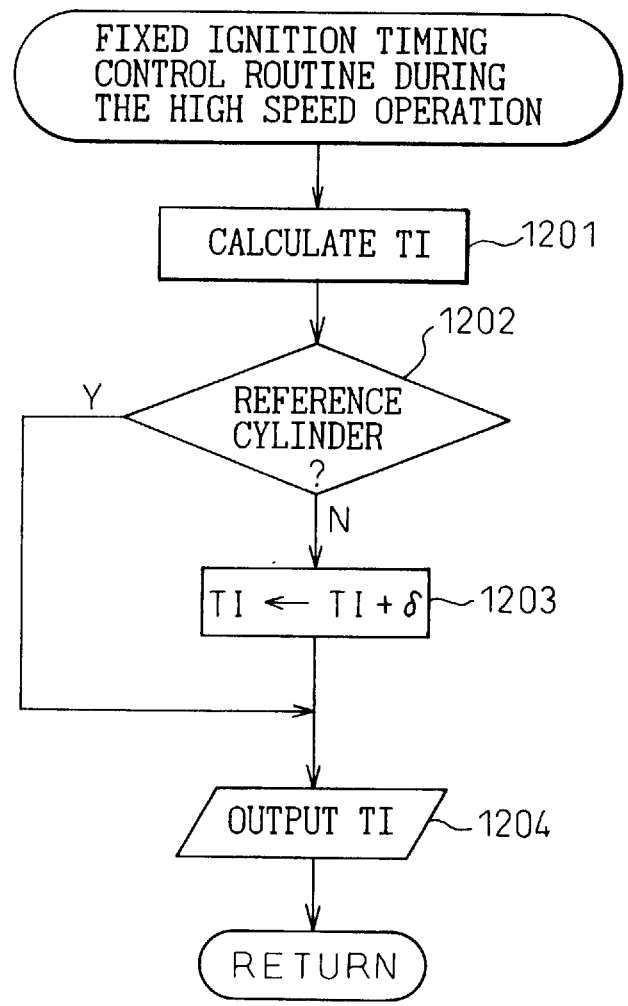
FIG. 26 is a flow chart illustrating a procedure for processing a fixed ignition timing control routine during the high-speed operation.
FIG. 27 is a diagram of an ignition timing guard map used during the high-speed operation.

FIG. 26 is a flow chart illustrating a procedure for processing the fixed ignition timing control routine during the high speed operation. At a step 1201, first, reference is made to an ignition timing guard map for high speed operation shown in FIG. 27 based upon the intake pipe pressure PM, thereby to calculate the ignition timing TI. At a next step 1202, it is discriminated whether the processing is for the reference cylinder or not. When the processing is for the reference cylinder, the program proceeds to a step 1204. When the processing is for a cylinder other than the reference cylinder, on the other hand, the program proceeds to a step 1203 where the ignition timing TI from the map is corrected by a difference δ in the ignition timing among the cylinders, thereby to calculate an ignition timing for the cylinder. The program then proceeds to a step 1204. At this final step 1204, the ignition signal is formed depending upon the ignition timing TI and is output to end the routine.

According to the present invention as described above, there is provided a device for controlling knocking, which is capable of highly precisely detecting knocking and highly precisely controlling the ignition timing throughout the whole operation region of an internal combustion engine and for all cylinders.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A device for controlling knocking of an internal combustion engine, comprising:

a first occurrence-of-knocking discrimination means which applies a voltage across a pair of electrodes installed in a combustion chamber of the internal combustion engine, detects an ionic current flowing between said pair of electrodes through ions generated when a gas mixture in the combustion chamber burns, and discriminates whether the knocking is occurring or not based upon the ionic current that is detected;

a second occurrence-of-knocking discrimination means which detects vibration of the cylinder block by using a vibration sensor installed in the cylinder block of the internal combustion engine, and discriminates whether the knocking is occurring or not based upon the vibration of the cylinder block that is detected; and an ignition timing control means which controls the ignition timing of the internal combustion engine based upon the result of discrimination of either said first occurrence-of-knocking discrimination means or said second occurrence-of-knocking discrimination means depending upon the operation region of the internal combustion engine.

2. A device according to claim 1, wherein when the internal combustion engine is in a high rotational speed operation region in which it is difficult to pick up the knocking vibration components from the ionic current signals due to noise caused by LC resonance in the ionic current passage, said ignition timing control means controls the ignition timing based upon the result of discrimination by said second occurrence-of-knocking discrimination means.

3. A device according to claim 1, wherein when the internal combustion engine is in a low rotational speed operation region in which it is difficult to pick up the knocking vibration components from the ionic current signals due to noise caused by variation in the combustion, said ignition timing control means controls the ignition timing based upon the result of discrimination by said second occurrence-of-knocking discrimination means.

4. A device according to claim 1, wherein when the internal combustion engine is in a high rotational speed operation region in which it is difficult to pick up the knocking vibration components from the vibration of the cylinder block due to mechanical noise, said ignition timing control means controls the ignition timing based upon the result of discrimination by said first occurrence-of-knocking discrimination means.

5. A device according to claim 1, wherein the internal combustion engine has a plurality of cylinders, and when said ignition timing control means controls the ignition timing based upon the result of discrimination by said first occurrence-of-knocking discrimination means, a difference is determined between an ignition timing for a reference cylinder and an ignition timing for a cylinder other than the reference cylinder, and when said ignition timing control means controls the ignition timing based upon the result of discrimination by said second occurrence-of-knocking discrimination means, an ignition timing is calculated for the reference cylinder relying upon the result of discrimination by said second occurrence-of-knocking discrimination means and an ignition timing for a cylinder other than the reference cylinder is calculated by correcting the ignition timing for the reference cylinder by said difference in the ignition timing.

6. A device according to claim 1, wherein when the internal combustion engine is in an operation region where it is difficult to pick up the knocking vibration components from the ionic current signals due to noise caused by LC resonance in the ionic current passage and it is difficult to pick up the knocking vibration components from the vibration of the cylinder block due to mechanical noise, said ignition timing control means inhibits the discrimination by said first and second occurrence-of-knocking discrimination means, and fixes the ignition timing to a predetermined value.

* * * * *